United States Patent
Crouch et al.

(10) Patent No.: US 9,305,186 B2
(45) Date of Patent: *Apr. 5, 2016

(54) PROTECTION OF PROPRIETARY EMBEDDED INSTRUMENTS

(71) Applicant: ASSET InterTech, Inc., Richardson, TX (US)

(72) Inventors: Alfred L. Crouch, Cedar Park, TX (US); John C. Potter, Austin, TX (US)

(73) Assignee: ASSET INTERTECH, INC., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,002

(22) Filed: Oct. 7, 2014

(65) Prior Publication Data

US 2015/0026822 A1 Jan. 22, 2015

Related U.S. Application Data

(63) Continuation of application No. 12/898,533, filed on Oct. 5, 2010, now Pat. No. 8,881,301.

(60) Provisional application No. 61/248,534, filed on Oct. 5, 2009.

(51) Int. Cl.
*G06F 21/78* (2013.01)
*G01R 31/3185* (2006.01)
*G01R 31/3177* (2006.01)
*G01R 31/317* (2006.01)

(52) U.S. Cl.
CPC ............ *G06F 21/78* (2013.01); *G01R 31/3177* (2013.01); *G01R 31/318558* (2013.01); *G01R 31/318588* (2013.01); *G01R 31/31719* (2013.01); *G06F 2221/034* (2013.01)

(58) Field of Classification Search
CPC ........................... G06F 21/78; G06F 2221/034
See application file for complete search history.

(56) References Cited

U.S. PATENT DOCUMENTS 4,872,169 A 10/1989 Whetsel, Jr.
6,247,147 B1 * 6/2001 Beenstra ............ G01R 31/3177
714/39

(Continued)

FOREIGN PATENT DOCUMENTS

EP 1443338 A1 8/2004

OTHER PUBLICATIONS

Hely, D. et al.; "Test Control for Secure Scan Designs"; Test Symposium, 2005, European Tallinn, Estonia May 22-25, 2005, Piscataway NJ, USA; IEEE May 22, 2005, pp. 190-195; XP010801332.

(Continued)

*Primary Examiner* — Hadi Armouche
*Assistant Examiner* — Sher A Khan
(74) *Attorney, Agent, or Firm* — CARR Law Firm PLLC

(57) ABSTRACT

A network of storage units has a data path which is at least a portion of the network. The network also has a key storage unit and a gateway storage unit. If the key storage unit stores a key value, the key storage unit transmits a key signal to the gateway storage unit. If the gateway storage unit does not store a gateway value or the key signal is not transmitted to the gateway storage unit, the gateway storage unit does not insert a data path segment in the data path. If the gateway storage unit stores a gateway value and the key signal is transmitted to the gateway storage unit, the gateway storage unit inserts the data path segment.

19 Claims, 19 Drawing Sheets

(56) References Cited

U.S. PATENT DOCUMENTS

| | | | |
|---|---|---|---|
| 6,286,114 B1 * | 9/2001 | Veenstra | G01R 31/3177 703/16 |
| 6,957,340 B1 | 10/2005 | Pang et al. | |
| 6,965,675 B1 * | 11/2005 | Trimberger | G06F 21/76 380/277 |
| 7,562,274 B2 | 7/2009 | Chorn et al. | |
| 7,590,504 B2 | 9/2009 | Chorn et al. | |
| 7,600,166 B1 | 10/2009 | Dunn et al. | |
| 7,886,150 B2 * | 2/2011 | Stollon | G01R 31/31719 713/169 |
| 8,881,301 B2 * | 11/2014 | Crouch et al. | 726/27 |
| 2002/0065646 A1 | 5/2002 | Waldie et al. | |
| 2003/0131325 A1 | 7/2003 | Schubert et al. | |
| 2003/0208708 A1 * | 11/2003 | Sunter | G01R 31/3012 714/727 |
| 2006/0022815 A1 | 2/2006 | Fischer et al. | |
| 2007/0192874 A1 | 8/2007 | Tucker | |
| 2007/0214392 A1 | 9/2007 | Franco et al. | |
| 2008/0052576 A1 | 2/2008 | Brandyberry et al. | |
| 2008/0148118 A1 | 6/2008 | Morgan et al. | |
| 2008/0195896 A1 * | 8/2008 | Kuo | G06F 11/27 714/39 |
| 2008/0215943 A1 * | 9/2008 | Guo | G01R 31/3177 714/729 |
| 2008/0282087 A1 * | 11/2008 | Stollon | G01R 31/31719 713/171 |
| 2009/0177814 A1 * | 7/2009 | Cardoso | G01R 31/31719 710/71 |
| 2010/0131729 A1 | 5/2010 | Fulcheri et al. | |

OTHER PUBLICATIONS

PCT/US2010/051516; International Search Report and Written Opinion; Dec. 22, 2010.

* cited by examiner

PROTECTION OF PROPRIETARY EMBEDDED INSTRUMENTS

CROSS-REFERENCE TO RELATED APPLICATIONS

This application is a continuation of, and claims the benefit of the filing of, co-pending U.S. patent application Ser. No. 12/898,533 entitled PROTECTION OF PROPRIETARY EMBEDDED INSTRUMENTS, filed Oct. 5, 2010, which claims the benefit of the filing date of, U.S. provisional patent application Ser. No. 61/248,534 entitled METHOD AND SYSTEM FOR PROTECTING ACCESS TO EMBEDDED INSTRUMENTS, filed Oct. 5, 2009, the entire contents of which are incorporated herein by reference for all purposes.

TECHNICAL FIELD

The present invention relates to networks of storage units and, more particularly, to networks of storage units having proprietary embedded instruments.

BACKGROUND

Modern semiconductor chips have a wealth of embedded logic for various purposes. Most embedded logic is for IC Test and for IC Debug. There is also logic that is used for process monitoring, yield monitoring, environment monitoring, fault tolerance, and functional configuration. Since there are many purposes for the embedded logic and there has been no standard name established, herein the embedded logic will be generically referred to as "instruments." Some examples of instrument functions include setting an operating frequency, adjusting power consumption, setting the size of the operating memory, selecting the type of data bus (PCIe, Xaui, etc.), turning data encryption on and off, setting the drive strength of the pins, tuning the chip for its environment (adjusting the voltage and clock frequency to fit the board that the chip is installed within) and so on.

Typically, instruments are involved in some way with embedded configuration and measurement. Some instruments may be intended for use at several levels of an IC lifecycle and by organizations other than the IC provider. These instruments may be referred to as "public" instruments. For example, a public instrument may be intended for use by the IC designer during evaluation and characterization, by the IC manufacturer during test, and by the IC integrator during board test and system development and tuning.

However, another class of instruments may be intended to be used only by a limited group of entities for specific purposes. These instruments may be referred to as "private," "restricted," or "proprietary" instruments. As an example, a private instrument may be intended for use only by the IC designer during characterization or only by the IC manufacturer for test purposes.

Some private instruments may be considered destructive. An example is a fuse block that controls power-gating or memory self-repair and, if activated, would result in a processor core being shut off or a memory being remapped to include bad rows and columns. Preferably, no entity outside of a limited group should have access to a private instrument or even know of the existence of a private instrument.

The IEEE 1149.1 Standard

In the early 1990s, the IEEE 1149.1 Boundary Scan Standard was ratified to solve the problem of not having access to the chip-to-board connections involving surface mount chips. 1149.1, also known as JTAG for the Joint Test Action Group that developed it, is a board test standard that accesses an embedded set of serial scan path registers designed into the chip. When the chip is on a board, the registers enable a board test function.

The 1149.1 standard defined three main items: the Test Access Port (TAP), the TAP controller, and the Boundary Scan Register. The TAP defines four signals which must exist on the chip package. The TAP Controller includes an Instruction Register, a Bypass Register, and a finite state machine (FSM) that dictates the sequence and event-order of operations conducted by the various registers. The Boundary Scan Register is a register associated with the chip Input, Output, and Bidirectional signals. The Boundary Scan Register may sample or over-drive those signals, allowing those signals to be verified when the chip is integrated onto a board.

Since there are different test requirements and different numbers of pins on different chips in the marketplace, a later revision of 1149.1 added a description language, the Boundary Scan Description Language (BDSL), to provide a standard method to document the implemented architecture and the collection of supported features, or instructions, supported by any chip-specific 1149.1 design.

Soon after 1149.1's ratification, acceptance, and use as a board test standard, chip designers began using the JTAG TAP and TAP Controller as an IC test or IC debug controller. There were several drivers that led to this practice: reuse of existing logic and package pins, cost and complexity of developing custom test controllers, availability of software to operate the TAP, and the use of embedded IP Cores that may have previously been chips and had supported a JTAG boundary scan architecture. One of the main drivers was that designers noted the cleverness and simplicity of the 1149.1 TAP Controller and that it could be used to operate inside-the-chip features and functions, either by adding instructions to the JTAG Instruction Register which directly created control signals that were asserted as long as the instruction encoding was present, or by adding and using one or more Test Data Registers (TDRs) that would allow serial data to be delivered and extracted from embedded functions.

A TDR is a JTAG register that includes a serial scan path made of bit-cells. This scan path may also be referred to as a "scan pathway," a "scan chain," or a "scan register." A bit-cell comprises Shift storage element and optionally an Update storage element. The value stored in the Shift element may be stored in the Update element while the Shift element continues to operate.

In many cases, the logic function to be accessed by the JTAG logic would not be a perfect fit for JTAG control. The exact implementation would be a mixture between logic that observed the letter of the 1149.1 Standard and what could be viewed as a custom ad hoc logic solution. In addition, the IEEE 1500 Core Test Standard and the IEEE 5001 Nexus Debug Port Standard were developed. These standards officially used the 1149.1 defined TAP and TAP Controller as the ideal controller.

The practice of using the 1149.1 TAP and TAP Controller became so prevalent that this alternate use of the 1149.1 pins and control structure began to result in problematic operation of the 1149.1 logic for board test, its intended purpose. The main problems were in expanding the instruction register. The instruction register was normally small, with just three to five bits which could represent between eight up to thirty-two instructions. Attempting to describe items such as LBIST (Logic Built-In Self-Test) or MBIST (Memory Built-In Self-Test), both the signal connection and the functionality, in the BSDL language was something that BSDL was never meant to do.

Some IC devices had multiple hundreds of memories with individual memory BISTs that had multiple configurations. This would result in expanding the 1149.1 Instruction Register to being hundreds to thousands of bits long. Trying to describe the various modes and configurations would create erroneous BSDL. In addition, selecting embedded test by selecting one instruction does not provide flexible scheduling. When board test organizations would get the chip and the BSDL and put this information into standard 3rd-party tools, the BSDL would not be usable. Incorporating tens of chips on a board or in a system in a daisy-chain architecture would result in a concatenated set of JTAG Instruction Registers that exceeded the capabilities of simple board testers.

The IEEE 1687 Standard

Because of the growth in the use of embedded logic for IC test, IC debug, environmental monitoring (temperature, voltage, frequency), configuration (bus selection, power domains, clock domains), and self-repair (fuses), development of a new proposed IEEE standard, IEEE P1687, began. P1687 would specifically address the connection of embedded inside-the-chip logic to the 1149.1 TAP and TAP Controller. The preferred IEEE P1687 implementation would result in an embedded access network that could be designed without overloading the 1149.1 Instruction Register and without requiring excess content to be added to the BSDL file. The P1687 proposed standard currently solves these problems by recommending that one or just a few instructions are added to the 1149.1 Instruction Register and that these instructions connect a special TDR into the serial scan path between the TDI and TDO chip signals. The special TDR is known as a Gateway Register or Gateway TDR.

The P1687 preferred architecture would use a Gateway Register that is made from special "gateway" bit-cells known as Segment-Insertion-Bits (SIBs). A SIB is a special bit-cell that allows scan path segments to be inserted into and removed from the scan path based on the data shifted into the SIB and then latched by an update operation. A hierarchical scan path may be created and/or selected by inserting scan path segments. Under the previous 1149.1 standard, a control instruction selected the scan path registers.

This type of architecture allows the 1687 network itself to shrink and grow, based on the data in the network, whenever the 1149.1 FSM passes through the Update-DR state—as opposed to the 1149.1 method of installing a new instruction in the Instruction Register and passing through the Update-IR state.

The proposed 1687 Standard then has several main differences from 1149.1. First, the 1687 network allows dynamic length-changing scan paths while a single instruction resides in the 1149.1 Instruction Register, whereas the 1149.1 Standard requires a fixed-known-and-documented length scan path for each instruction. Second, all 1687 network actions occur on the Data-Register (DR) side of the 1149.1 FSM, whereas the 1149.1 Standard changes the 1149.1 active register based on changing instructions on the Instruction-Register (IR) side of the 1149.1 FSM. Third, the 1687 architecture will be described using a hardware description language (currently known as ICL, for Instrument-Connectivity-Language) associated directly with the 1687 Standard, as opposed to the 1149.1 BSDL—the only items described in the 1149.1 BSDL are the instructions that select 1687 Gateway Registers.

One of the main efficiencies of the 1687 Standard is that the 1149.1 portion of the architecture returns to the simplified board test configuration with a small Instruction Register and a small addition of information to the BSDL description. Another efficiency of the 1687 Standard is that a wealth of embedded content, known generically as instruments, may be accessed and operated with a dynamic data-driven system that allows adding and subtracting scan path segments by using the SIB concept.

Instrument Protection

In the past, each classification or grouping of instruments, such as test, debug, and yield, had its own custom interface and access mechanism depending on where in the IC lifecycle it was to be accessed. The test logic such as Manufacturing Scan, Logic BIST, Memory BIST, and other similar features has traditionally been accessed through borrowed functional pins and through wide, parallel interfaces that use lots of pins to reduce test time, as more tester channels operating in parallel reduces test time and cost. Debug Logic such as trace buffers, traffic monitors, and hardware assertions have traditionally been accessed through a small dedicated port that exists at both the ATE testing and when the chip is integrated on a board. Alternately, Debug Logic may time-share a functional interface such as a data bus. Yield monitors have generally been used during wafer processing or at wafer probe to assess the frequency, temperature, and voltage performance of the silicon-using items such as ring-oscillators and voltage-controlled-oscillators. Yield monitors are generally accessed through test pads.

Because of recent changes in silicon manufacturing to achieve sub-100 nanometer geometries, to truly assess silicon after manufacturing and during board integration many of these instruments may need to work together. This creates a need for same or a standard access mechanism for all of the instruments. By placing all of these instruments on the same access mechanism, the instruments may be used in conjunction with each other, test scheduling of any grouping of embedded instruments may be accommodated, power consumption during instrument use may be flexibly adjusted, power domains and clock domains where logic is totally quiescent when not being used may be accommodated, and the access cost in data bandwidth and access time may be flexibly adjusted as needed.

However, instrument protection is an issue with the current 1149.1 JTAG Method and the proposed 1687 Standard. The disadvantage to having all instruments within an IC on one access mechanism or access network is that a user of the access network now has access to all instruments and the user knows that all instruments, public or private, may be accessed and operated in a similar manner. For example, all IEEE 1687 Standard-based instruments may be written-to or operated-by serially shifting from the IC's TDI pin to place assertion bits into Test Data Registers (TDRs) and then conducting an Update-DR operation. All instruments may be read-from for state or status by conducting a Capture-DR and then serially shifting the TDRs out through the IC's TDO pin.

On one hand, there are benefits to documenting a 1687 network and instruments. The documentation provides ease of development, modular plug and play, the standardization to enable software automation for vector generation and vector reuse. The documentation also makes it easier for the different organizations such as design verification, IC test, and board test to understand and operate the instruments.

However, on the other hand, if a 1687 network is documented, all of the embedded content is visible to anyone that knows about the JTAG port and the 1687 network. An IC developer may wish to make private instruments known only to the IC developer's company and invisible to the public. For example, some instruments may be used by the IC developer to develop ATE-based tests for IC test and data-collection for yield-monitoring. For efficiency, these instruments are included in the 1687 network and are operated by the test and failure-analysis portions of the IC provider's company. When the IC is shipped to a customer that will integrate the IC onto the board, the private instrument's documentation may be removed. However, the bits in the scan path that feed the instrument will still be in the 1687 network.

The current practice for including private instruments in both 1149.1 and 1687 networks is to simply not document the existence of the instrument in the Hardware Description Language file publicly delivered with the chip. Alternately, the private instrument bits may be documented only as private bits. In either case, the function of the instrument is undocumented. However, existence of the instrument bits is apparent, either because the absence of documentation is conspicuous or because the bits are expressly documented as private. An individual may further investigate the bits with undocumented functions to discover the private instruments.

For private instructions for the 1149.1 standard, curious and malicious individuals and organizations have shifted-in values that represent the opcodes for private instructions and have attempted to figure out what the private instructions are for, even if the instructions are destructive. A similar course of events is expected for 1687 networks—undefined bits will be explored by curious and malicious individuals.

For 1149.1 networks, the documentation typically explains the size in bits of the 1149.1 instruction register, since instructions may be scanned in through the TDI pins and scanned out through the TDO pins. For example, a 5-bit instruction register may receive 32 possible instruction encodings. If only 16 instructions are documented in the BSDL file, then it is apparent that there are 16 encodings that may perform undocumented instructions. To investigate these undocumented private instructions, the encodings not documented in the BSDL may be shifted into the TDI and an Update-IR operation may be conducted. It is therefore not difficult to investigate these private instructions, as curious and malicious individuals have attempted to do.

Similarly, with networks based on the IEEE 1687 standard, a SIB that provides access to a scan path may be viewed as an instruction register. The scan paths may represent TDRs that may include other SIBs, or may be used as Instrument Interface Registers (registers that provide signals to and from instruments). When the function of a TDR or a SIB is left undocumented, the lack of documentation is conspicuous and invites further investigation.

For example, a 16-bit TDR may contain 16 SIBs that may open 16 different scan path segments. Six of those SIBs may be left undocumented or may be labeled as private. Each of those SIBs may open up individual scan paths that contain 32-bit registers used as interfaces to private instruments. Those 6 instruments are considered private, and they and their access mechanisms have been left undocumented.

However, SIBs are operated by serially shifting an assertion value, such as a logical 1, into the Shift cell using several Shift-DR operations. When the assertion value is shifted into the Shift cell, an Update-DR operation is conducted to move the logical 1 assertion value into position. The Update-DR operation opens the added scan path and provides access to the private 32-bit instrument interface. Curious or malicious individuals may then investigate what behaviors and operations occur when individual bits or certain encodings are installed into the 32-bit instrument interface.

In conclusion, an effort to not publicly document SIBs and hierarchical scan path registers is insufficient to prevent access to private instruments by unauthorized individuals and organizations. The lack of documentation may make those instruments distinguishable from the rest of the network. For example, the private instruments may appear as unused bits in a scan path with no associated documentation, or as bits documented as private bits given a "must always be a logical 0" directive. In either case, the absence of documentation is conspicuous and will attract the attention of an individual attempting to discover private instruments.

Therefore, absence of documentation may not be enough to keep an instrument private. There is a need to effectively hide the existence of private instruments from a curious individual or organization.

SUMMARY OF INVENTION

Accordingly, a network of storage units is provided in one exemplary embodiment of the present invention. The network of storage units has a data path, a data path segment, a gateway storage unit, and a set of one or more key storage units. Each of the key storage units is configured to transmit a key signal to the gateway storage unit in response to that key storage unit storing a key value. The gateway storage unit is configured to insert the data path segment in the data path in response to the gateway storage unit receiving a key signal from each of the key storage units and storing a gateway value.

In a further exemplary embodiment of the present invention, the network of storage units has a set of one or more trap storage units. Each of the trap storage units is configured to prevent the gateway storage unit from inserting the data path segment in response to that trap storage unit storing a trap value.

DESCRIPTION OF DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art. In some descriptions, the word "MUX" is an abbreviation for "multiplexer" and "MUXes" is an abbreviation for "multiplexers." The word "CF" is an abbreviation for "combinatorial function" (AND gate).

JTAG Scan Architecture

Figure 1:
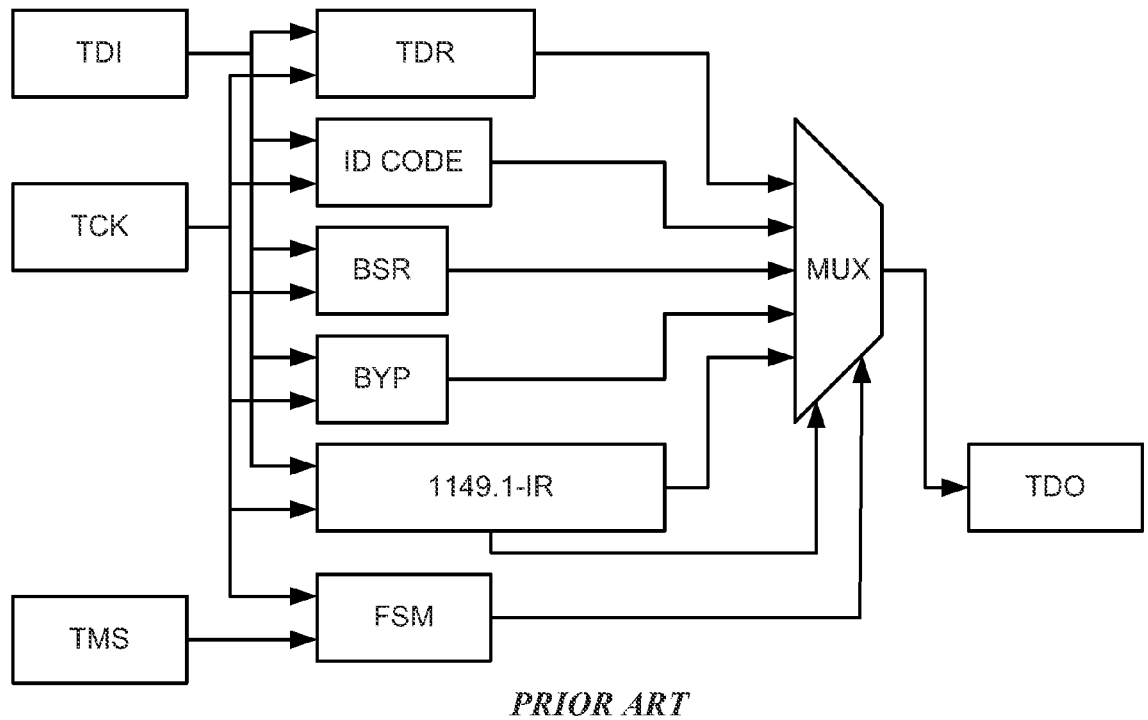
FIG. 1 is diagram of the IEEE 1149.1 JTAG Test Access Port (TAP) register architecture.

FIG. 1 shows a high-level diagram of a typical IEEE 1149.1 Scan Architecture, developed by the Joint Test Action Group (JTAG). The input ports to the Scan Architecture are the Test Data Input (TDI), the Test Clock (TCK), and the Test Mode Select (TMS). The output port from the Scan Architecture is the Test Data Output (TDO). The Scan Architecture also includes data shift registers, an instruction shift register (1149.1-IR), and a multiplexer (MUX). The data shift registers are a bypass register (BYP), a boundary scan register (BSR), a standardized identification code register (ID CODE), and one or more test data registers (TDR). Initially, data is shifted into the instruction shift register to install an instruction that is essentially the select controls on the multiplexer. The multiplexer chooses which register will produce the TDO.

Figure 2:
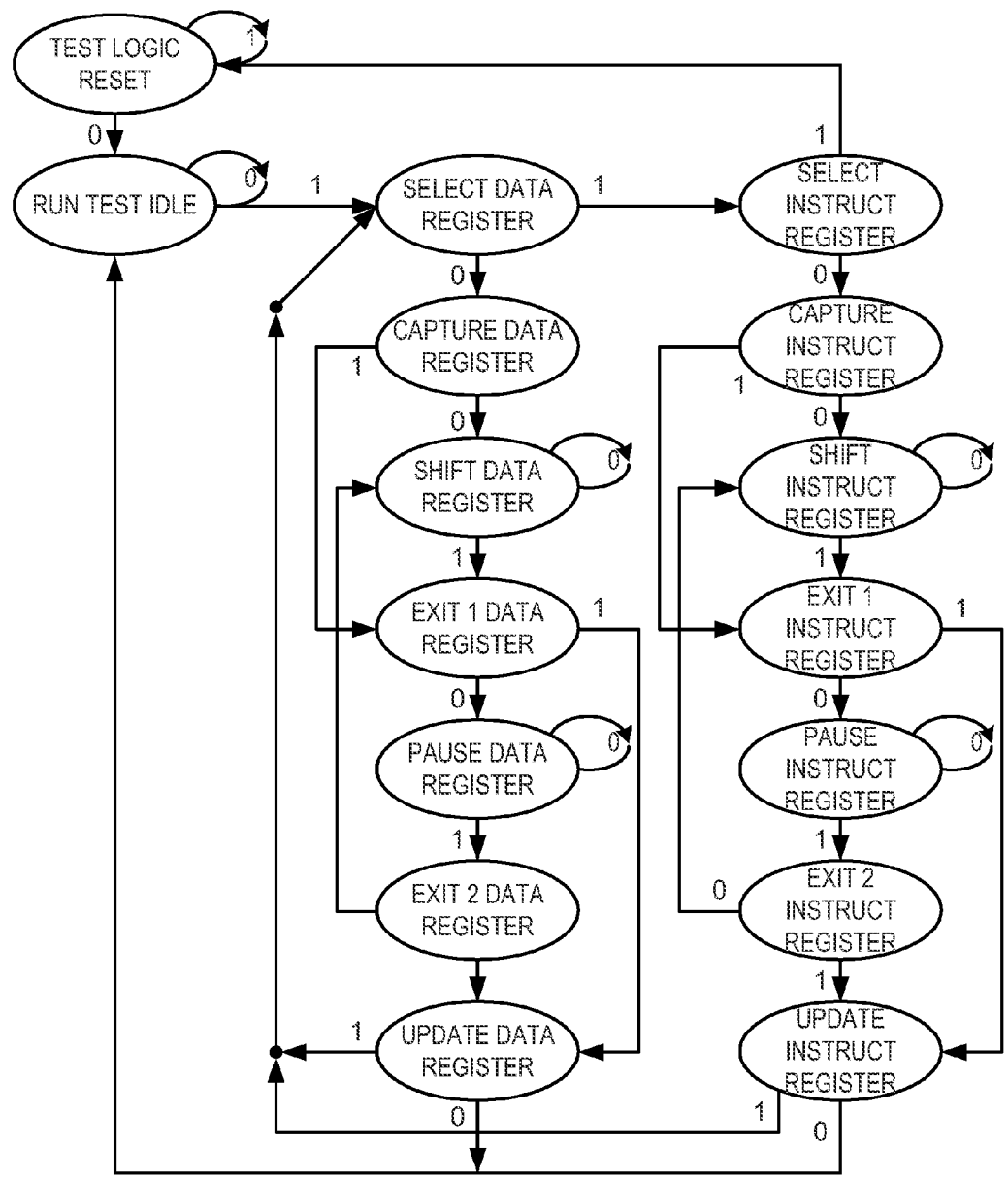
FIG. 2 is a diagram of the IEEE 1149.1 FSM.

FIG. 2 shows a diagram of an IEEE 1149.1 Finite State Machine (FSM), developed in order to get data in and out of the IEEE 1149.1 Scan Architecture. The FSM has a standardized sequencing that is defined and fully described in the IEEE 1149.1 specification. The state modes are driven by the Test Mode Select (TMS) port function of the Test Access Port (TAP). The Test Clock (TCK) is defined by the IEEE 1149.1 specification as the clocking source used by the FSM, the data shift registers, and the instruction register.

The FSM diagram in this figure is said to have two "legs" to it, a data register leg and an instruction register leg. The data register leg is shown as the center column of six states and targets the data registers. The instruction register leg is shown as the right column of six states and targets the instruction registers. Both legs have the same type of states (Select, Capture, Shift, Exit-1, Pause, Exit-2, and Update). For clarity of discussion, FSM states that deal with data registers will end in -DR (e.g., Select-DR, Capture-DR, etc.) and FSM states dealing with the instruction register will end in -IR. When the FSM is traveling down the DR leg, the states Capture, Shift, and Update issue a control signal to allow operation of TDRs and other 1149.1 type data registers.

Figure 3:
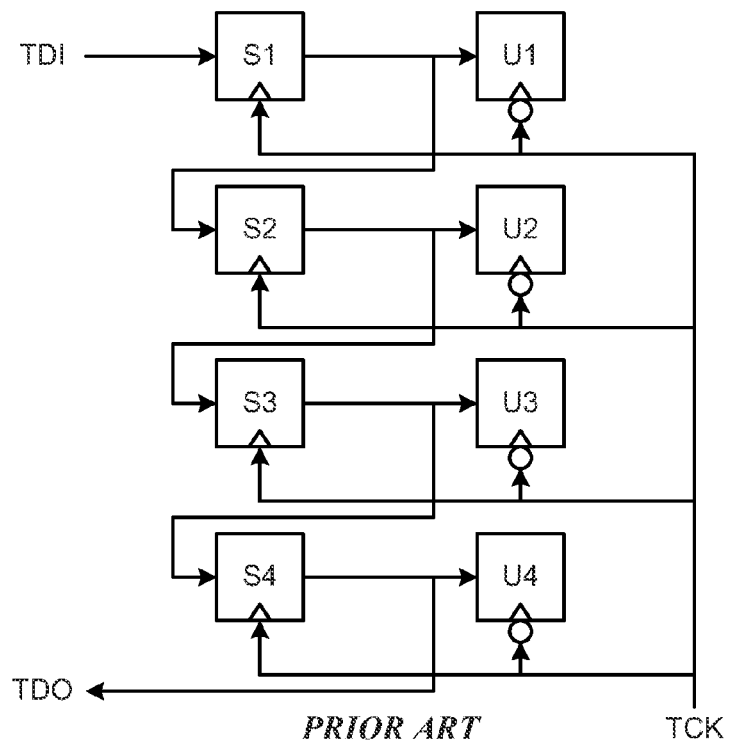
FIG. 3 depicts an example JTAG Test Data Register (TDR)

FIG. 3 shows a high-level diagram of a JTAG Test Data Register (TDR). A "bit-cell" (also called a "bit") in a JTAG serial scan path network is a storage unit that has at least a storage element called a Shift element. A bit-cell may also have a shadow storage element called an Update element. When data travels from TDI to TDO, the data is shifted through one or more Shift elements. By asserting an UpDR signal, the value of the Shift element may be stored in a bit-cell's Update element. Typically, an instrument receives its inputs from an Update element of one bit-cell and stores its outputs in a Shift element of another bit-cell.

The Update element isolates the instrument signals from the constantly changing and spurious logic values that occur as part of the shifting process. The Shift element and the Update element are both storage elements which may store different values. Technically then, a single "bit-cell" that has both a Shift element and an Update element stores two "bits" (binary digits). This is true even though the bit-cell itself is sometimes called a "bit." Because the value of the Shift element is constantly changing, the value said to be "stored" in a bit-cell with an Update element is the value stored in the Update element. The value said to be "stored" in a bit-cell with no Update element is the value stored in the Shift element.

Herein, Shift elements will be depicted as beginning with "S" while Storage elements will be depicted as beginning with "U". In FIG. 3, S1 through S4 are Shift elements and U1 through U4 are Storage elements. The four pairs of Shift elements and Storage elements (S1 and U1, S2 and U2, S3 and U3, and S4 and U4) make up four bit-cells, which may be referred to as Bit-cells 1 through 4. A TDR may be made up of one or more registers, so the TDR of FIG. 3 could be one register that is four bit-cells wide, two registers that are each two bit-cells wide, and so on. Whether a TDR is made up of multiple registers and where those registers begin and end is not as important as the bit-cells the TDR contains.

The shifting in a data register occurs when the JTAG FSM is in the Shift-DR state. The Update element only captures the state of its paired Shift element during an Update-DR event. An Update-DR event occurs when the JTAG FSM enters the Update state and the TCK produces a negative edge. The Update-DR state generates an UpdateDR signal that may be physically routed or implemented in various forms to cause the Update element to capture the state of the Shift element. In some cases, the Shift element has a secondary input that allows data to be captured into it when a Capture-DR event occurs.

The data path which data from TDI follows when it passes from TDI to TDO through one or more bit-cell locations is called a JTAG scan path or JTAG scan chain. In FIG. 3, the length of the scan path is four bit-cell locations. The scan path may be made longer through inserting additional bit-cell locations between S4 and TDO, either in the same register or a different register.

Although there are several different sequences of states that may occur in the data register leg of the FSM, a typical sequence is: Capture-DR once, Shift-DR the length of target register, Exit-1-DR once, Update-DR once. The operation of the 1149.1 TAP State-Machine through Capture-DR, then optionally conducting several Shift-DR operations, and then exiting the DR-side of the state machine by passing through the Update-DR operation is known as a ScanDR operation.

Figure 4:
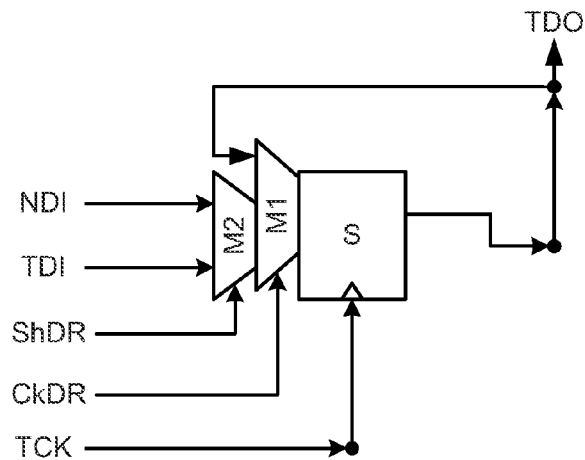
FIG. 4 depicts an example Capture-Shift Only Bit.

FIG. 4 is an example of a Capture-Shift Only Bit. This bit-cell is one of the basic bit-cells available for building a JTAG scan path and is common in JTAG networks. Notably, the Capture-Shift Only Bit has a Shift element but no Update element. Capture-Shift Only Bits are commonly used to capture output from instruments. Capture-Shift Only Bits are sometimes referred to as "read-only" bit-cells.

Data enters the Capture-Shift Only Bit through the TDI port and exits through the TDO port. The Normal Data Input (NDI) port allows for capture of instrument data. Data flow is clocked by TCK. The ShDR and CkDR ports are typically controlled by a JTAG TAP Controller, but may be controlled by other means.

The ShDR signal controls the select port on multiplexer M2. Multiplexer M2 has data inputs of NDI and TDI. If the ShDR signal is asserted, then the logic state, or value, of TDI is connected to the output of M2. If ShDR is de-asserted, then the logic state of NDI is connected to the output of M2.

Figure 5:
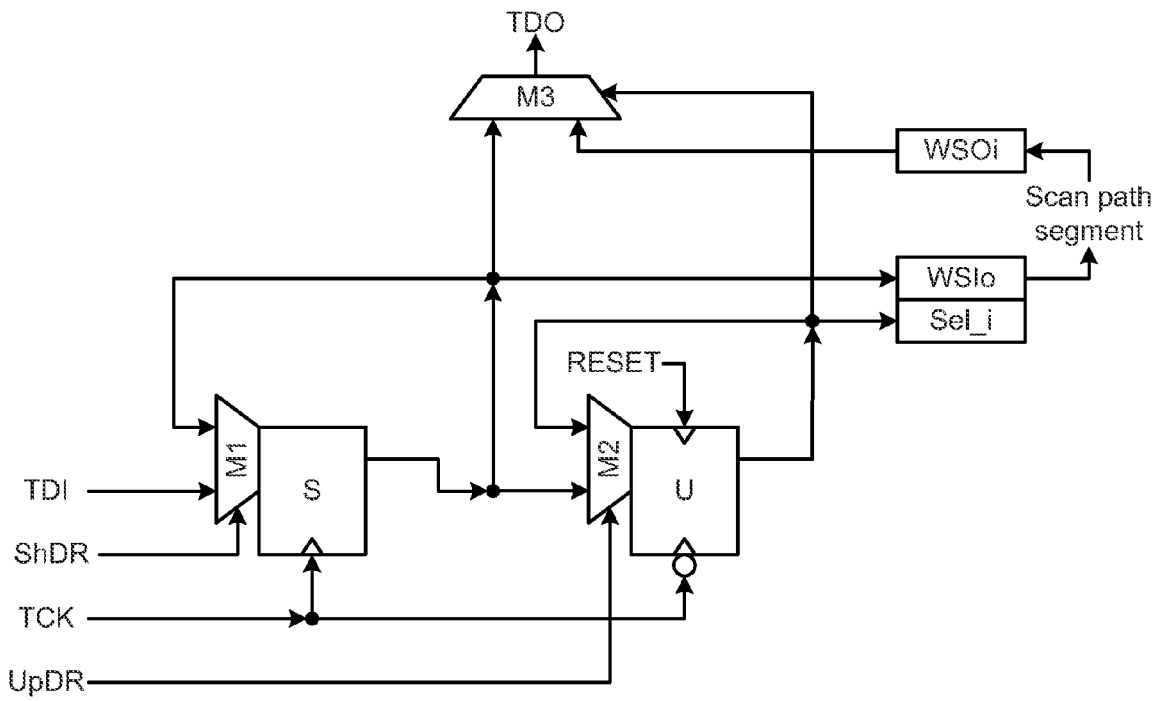
FIG. 5 depicts an example Segment Insertion Bit (SIB) Gateway.

The CkDR signal controls the select port on MUX M1. If the CkDR signal is asserted, then the logic state, or value, of M2 is stored in Shift element S on the next rising edge of TCK. If CkDR is de-asserted, then Shift element S retains state because the output of Shift element S is re-circulated back into Shift element S on the next rising edge of TCK. THE BASIC SIB GATEWAY FIG. 5 is an example of a basic Segment Insertion Bit (SIB) Gateway or SIB. A SIB Gateway is an extension of the basic IEEE 1149.1 Shift-Update Cell. The purpose of a SIB Gateway is to insert an additional segment into or remove an additional segment from the scan path based on the data value that is transferred from Shift element S to Update element U during an Update-DR event. The SIB Gateway is called a "Gateway" bit-cell because it may open and close access to scan path segments. When the scan path segment controlled by a SIB Gateway is part of the scan path, the SIB Gateway is said to be "open." When the scan path segment is not part of the scan path, the SIB Gateway is said to be "closed."

The use of the SIB Gateway introduces the existence of dynamic scan paths within what is initially a simple TDR scan path structure. When the SIB Gateway is opened, a shift path through the Hierarchical Interface Port (HIP) becomes active. The HIP consists of ports WSIo, WSOi, and Sel_i. Activation of the HIP allows access to other bit-cells that may be used to interface with embedded IP.

The basic SIB Gateway of FIG. 5 includes multiplexers M1, M2, and M3, Shift element S, and Update element U. Shift element S and Update element U, the two storage elements, are clocked by TCK. When Shift element S is enabled, Shift element S captures data on the rising edge of TCK. When Update element U is enabled, Update element U captures data on the falling edge of TCK, so TCK is inverted prior to entering Update element U. The output of Shift element S is WSIo. The output of Update element U is Sel_i.

The ShDR signal controls the select port on M1. The output of M1 is attached to Shift element S. If the ShDR signal is asserted, then the logic state, or value, of TDI is stored in Shift element S on the next rising edge of TCK. If ShDR is de-asserted, then Shift element S retains state because the output of Shift element S is re-circulated back into Shift element S on the next rising edge of TCK.

Similarly, the UpDR signal controls the select port on M2. The output of M2 is attached to Update element U. If the UpDR signal is asserted, then the logic state, or value, of Shift element S is stored in Update element U on the next falling edge of TCK. If the UpDR signal is de-asserted, then Update element U retains state because the output of Update element U is re-circulated back into Update element U on the next falling edge of TCK.

WSIo is transmitted to the inserted scan path segment. The output of the inserted scan path segment returns as WSOi. When Sel_i is asserted, the TDO source becomes WSOi. When Sel_i is de-asserted, the TDO source becomes WSIo.

To open the SIB Gateway, TDI and ShDR are asserted, causing a logical 1 to be stored in Shift element S during the next rising edge of TCK. Next, UpDR is asserted, causing the logical 1 in Shift element S to be stored in Update element U during the next falling edge of TCK. While Sel_i, the output of Update element U, remains asserted, the scan path segment is part of the scan path and its output, WSOi, is transmitted as TDO.

To close the SIB Gateway, TDI is de-asserted and ShDR is de-asserted, causing a logical 0 to be stored in Shift element S during the next rising edge of TCK. UpDR is asserted, causing the logical 0 in Shift element S to be stored in Update element U during the next falling edge of TCK. While Sel_i, the output of Update element U, remains de-asserted, the scan path segment is no longer part of the scan path. The output of Shift element S is transmitted as TDO and WSOi, the output of the scan path segment, is ignored.

When Reset is asserted, the Update element U de-asserts signal Sel_i. Reset returns the SIB Gateway to a default state where serial data flow is from TDI to TDO. Upon a reset, the scan path segment is not part of the scan path.

Figure 6:
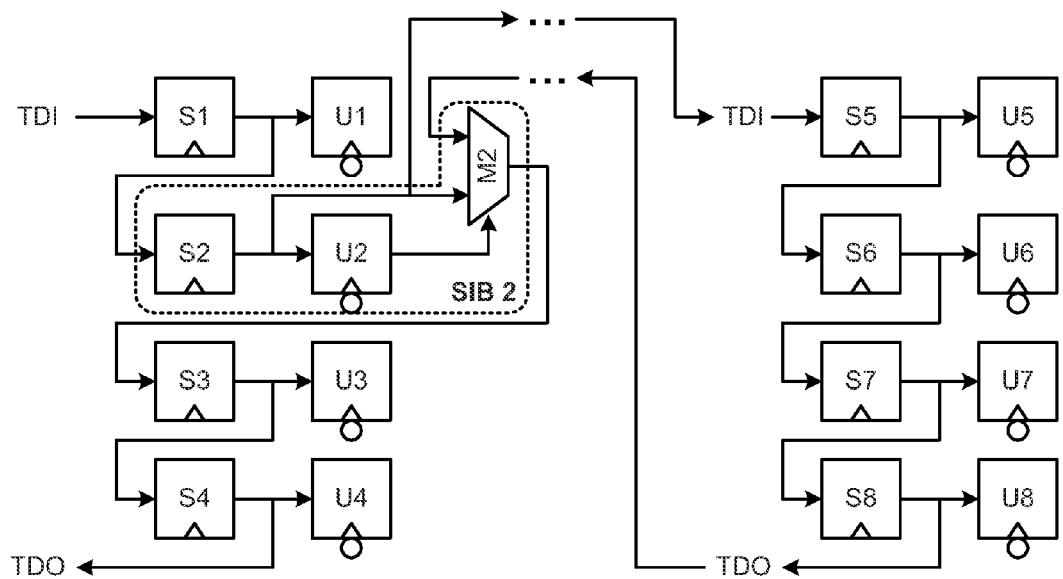
FIG. 6 depicts an example IEEE P1687 serial network containing a SIB Gateway.

FIG. 6 is an example of a serial scan path network which contains a SIB Gateway. The network uses an IEEE 1149.1 JTAG TDR as an access network. Again, S1 through S8 and U1 through U8 are storage elements. S1 through S8 are Shift elements, and U1 through U8 are Update elements. The eight pairs of Shift and Update elements make up 8 bit-cells, Bit-cells 1 through 8.

Bit-cells 1 through 8 are connected to form the serial network. Bit-cells 1 and 3-8 may be generally referred to as Signal Generation Bits and may store data provided to or received from embedded instruments.

Bit-cell 2 is the SIB Gateway and is designated as SIB 2. SIB 2 comprises S2, U2, and M2. M2 is a multiplexer which is at the position of multiplexer M3 in FIG. 5. SIB 2 is the gateway to a scan path segment that includes Bit-cells 5-8. To access these bit-cells, the scan path segment must be inserted into the scan chain.

Data enters the network through the TDI port on Si and eventually exits the network at the TDO port on S4. To insert the scan path segment, a logic value of 1 is shifted into S2 and the UpDR signal is asserted during the falling edge of TCK. The logical 1 is stored in U2, which then switches M2, serially inserting Shift elements S5 through S8 between Shift elements S2 and S3. This grows the scan path from four Shift elements to eight Shift elements and makes Bit-cells 5 through 8 accessible. Access to Bit-cells 5 through 8 may then be closed by shifting a logic value of 0 into S2 and asserting the UpDR signal during the falling edge of TCK. U2 will store the 0 value of S2 and switch M2, removing Shift elements S5 through S8 from the scan path.

Figure 7:
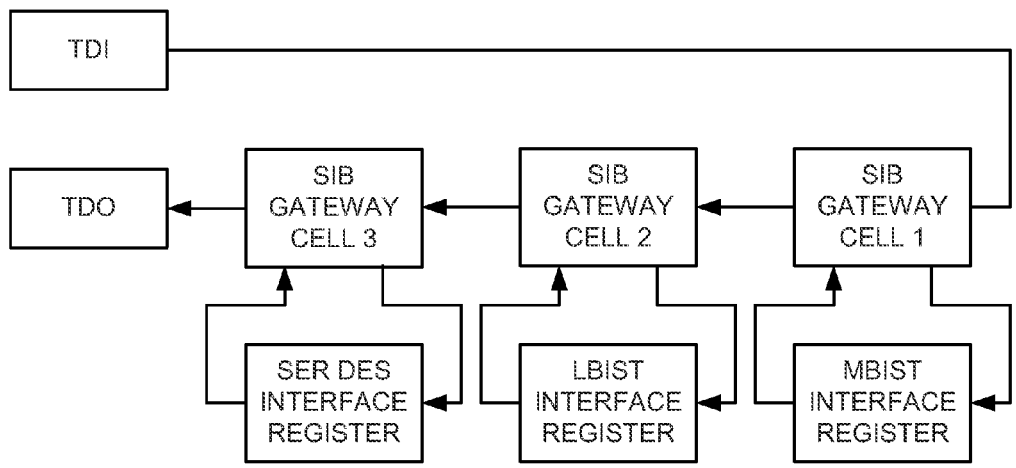
FIG. 7 depicts an example IEEE P1687 serial network illustrating how a SIB Gateway may provide access to an instrument.

FIG. 7 is an example of a hierarchically connected, serial SIB-based access network. This type of network is ideal for hiding private instruments from investigation, as will be discussed below. A hierarchically connected network is also capable of power management and flexible scheduling.

FIG. 7 illustrates the use of SIBs to control access to each of three instruments on a network. The three instruments are a Memory Built-In Self Test ("MBIST"), a Logic Built-In Self Test ("LBIST") and a SER DES ("SER DES"). The hierarchical network of FIG. 7 has a TDR that is selected by the 1149.1 instruction register. The TDR is a scan path, and contains SIB Gateway Cell 1, SIB Gateway Cell 2, and SIB Gateway Cell 3. Three scan path segments each contain an interface register for one of the three instruments. These interface registers may contain one or more Bit-cells.

The SIB Gateway Cells control access to the scan path segments, and therefore control access to the interface registers and their instruments. SIB Gateway Cell 1 controls access to the MBIST, SIB Gateway Cell 2 controls access to the LBIST, and SIB Gateway Cell 3 controls access to the SER DES. Zero or more of the three instruments may be chosen for access by opening and closing the SIB Gateway Cells.

Figure 8:
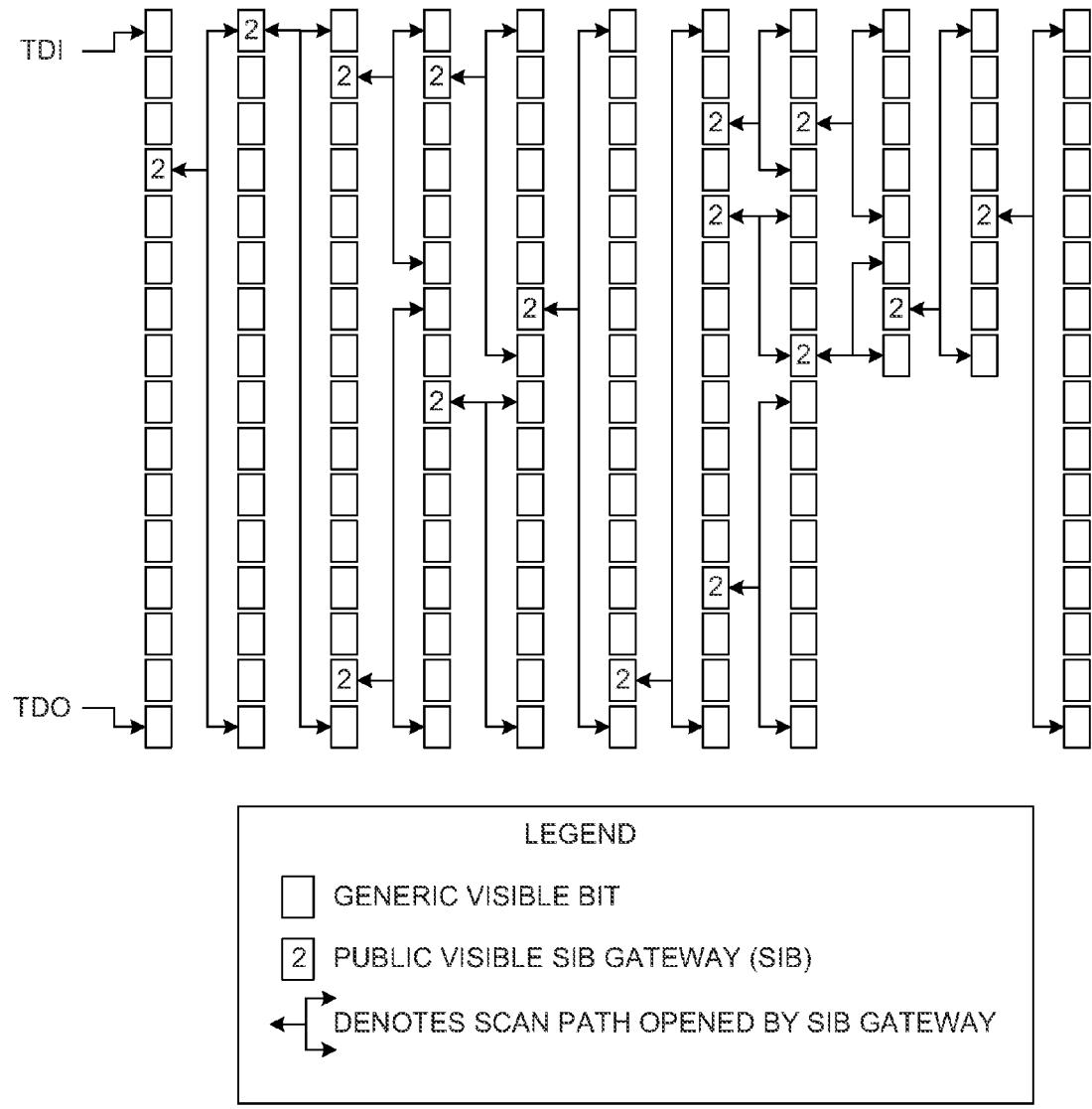
FIG. 8 depicts an example IEEE P1687 serial network illustrating SIB Gateways which provide access to other SIB Gateways.

FIG. 8 is an example of an IEEE P1687 Network. The empty rectangles represent generic visible bit-cells. Each of these bit-cells has a Shift element. Some, none, or all of these bit-cells have an Update element. A Shift element may capture information from an instrument. An Update element may drive an instrument signal. The visible bit-cells may be documented or undocumented, but if undocumented the existence of these bit-cells may be readily determined from the length of the scan path.

The rectangles labeled "2" represent public visible SIB Gateways. When activated, each SIB Gateway opens another level of TDR bit-cells. In FIG. 8, the bit-cells opened by a SIB Gateway are shown bracketed by arrows to the right of the SIB Gateway. When all of the SIB Gateways are activated, the P1687 Network is said to be at its maximal length. In the example of FIG. 8, the rectangles labeled "2" represent both the control point and the insertion point (the branch point where the inserted scan path segment begins and returns). However, the control point and the insertion point may also be in different locations.

The SIB Gateway concept allows more flexible instrument scheduling, since any scan path segment or combination of scan path segments may be opened by conducting an Update-DR, and the instruments interfaced to those scan path segments may be operated simultaneously if they are independent. The SIB Gateway concept allows more active control of scan path length, which may reduce the access time of operating certain instruments. The SIB Gateway concept allows scalability, since SIB Gateways may be hierarchically connected. Scalability allows IP Cores and other modular elements to be added to the network easily. The concept of adding further elements to the 1687 network by using SIB Gateways is known as Plug-and-Play.

Note the configuration of a SIB Gateway may vary. The configurations shown herein are examples. The ultimate goal of the 1687 network is to provide access to one or more TDR-type registers used as an instrument interface. The registers connect the 1687 network to the signals of the instrument.

The Memory BIST as an Example Instrument

Figure 9:
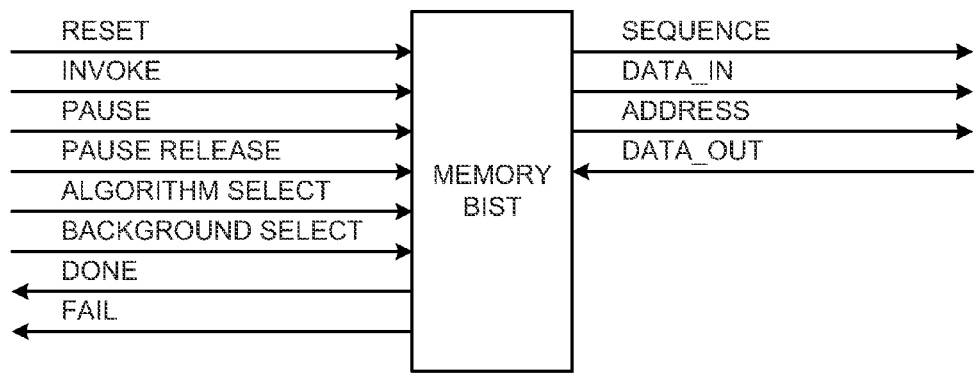
FIG. 9 depicts an example instrument, a Memory BIST (MBIST)
Figure 10:
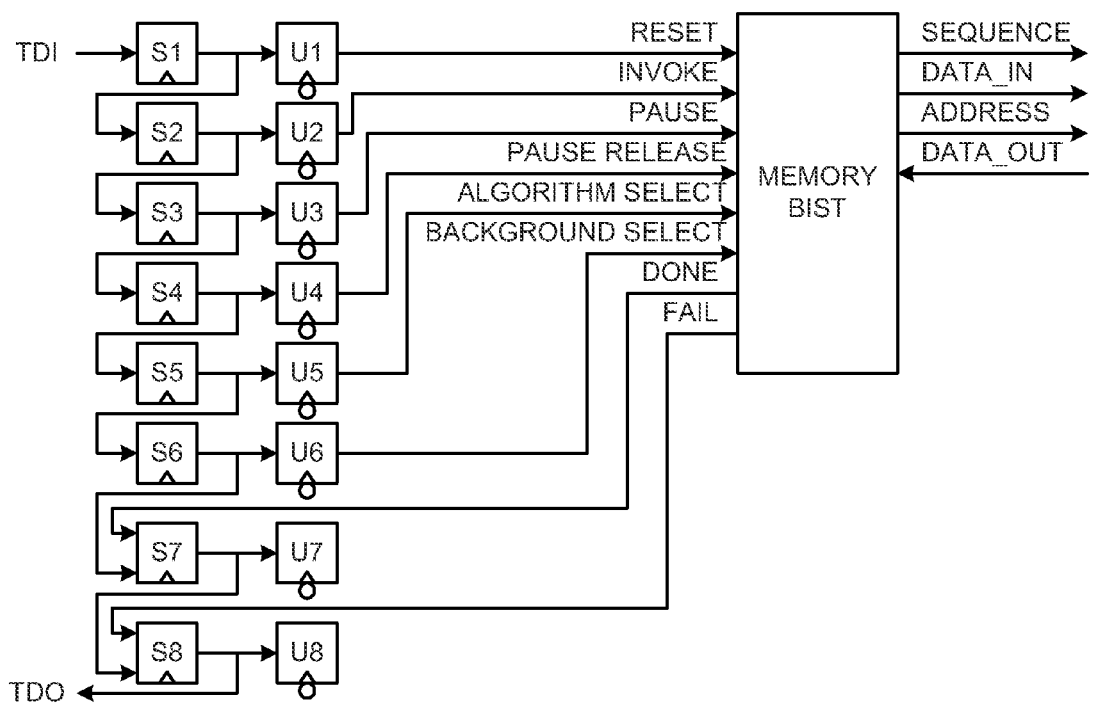
FIG. 10 depicts an example of a JTAG TDR used as an instrument interface register.

FIG. 9 depicts a Memory Built-In Self Test (MBIST), an example instrument. This instrument has six inputs (Reset, Invoke, Pause, Pause Release, Algorithm Select, and Background Select) and two outputs (Done, Fail) that connect to a 1687 network. Instruments may have any number of inputs and outputs to a 1687 network. Furthermore, an instrument may have any combination of input signals or output signals. Typically, an instrument has at least one input signal and at least one output signal, or at least one bidirectional signal. Also depicted in FIG. 10 are the Sequence, Data_In, Address, and Data_Out buses. Each bus is typically 24 to 32 bits wide.

FIG. 10 is an example of the MBIST in FIG. 9 connected to a JTAG TDR. Because of the connected MBIST, the TDR may be referred to as a "MBIST TDR." In this simple example, each signal is associated with a single bit-cell, and each bit-cell is a Shift/Update pair of cells. For example, the signal "Reset" is associated with Bit-cell 1 (S1 and U1), the signal "Invoke" is associated with Bit-cell 2 (S2 and U2), and so on.

The six MBIST inputs (Reset, Invoke, Pause, Pause Release, Algorithm Select, and Background Select) are connected to Update elements U1 through U6 and the two MBIST outputs (Done, Fail) are connected to Shift elements S7 and S8. Each of the eight signals is assigned a bit-cell in the TDR. Therefore, eight bit-cells in the TDR are used to service the instrument. The number of bit-cells used to service the instrument could be reduced to six bit-cells using alternative connection schemes. For example, U7 and U8 could have been used as Capture bit-cell locations for two of the six MBIST inputs.

Operation of this circuit is straightforward as it relates to the operation of the JTAG FSM operation protocol. The signals on the MBIST are manipulated as the JTAG FSM passes through the JTAG FSM states Capture-DR, Shift-DR, and Update-DR. When the FSM passes through the Capture-DR state, the logic states of "Done" and "Fail" are captured into S7 and S8, respectively. This action may be viewed as a Read Function.

Through Shift-DR operations, the values of the Done and Fail signals are moved toward/out the TDO port. At the same time, drive data values for the desired logic state on the MBIST input signals Reset, Invoke, Pause, Pause Release, Algorithm Select, and Background Select are shifted into place. The FSM then passes through the Update-DR state and causes the logic content in the Shift element to be moved into the Update element for each Shift-Update element pair. This action may be viewed as a Write Function.

The 1687 instrument interface network accesses signals needed for control, configuration, necessary operation data, and data or status to be read. An instrument may have other operation signals which are not accessible through registers in a 1687 network. In other words, an instrument is not required to have all of its operation signals connected to, or "wrapped" by, the 1687 network. In FIG. 10, the Sequence, Data_In, Address, and Data_Out buses are part of the instrument's function and are not connected to the 1687 network.

Figure 11:
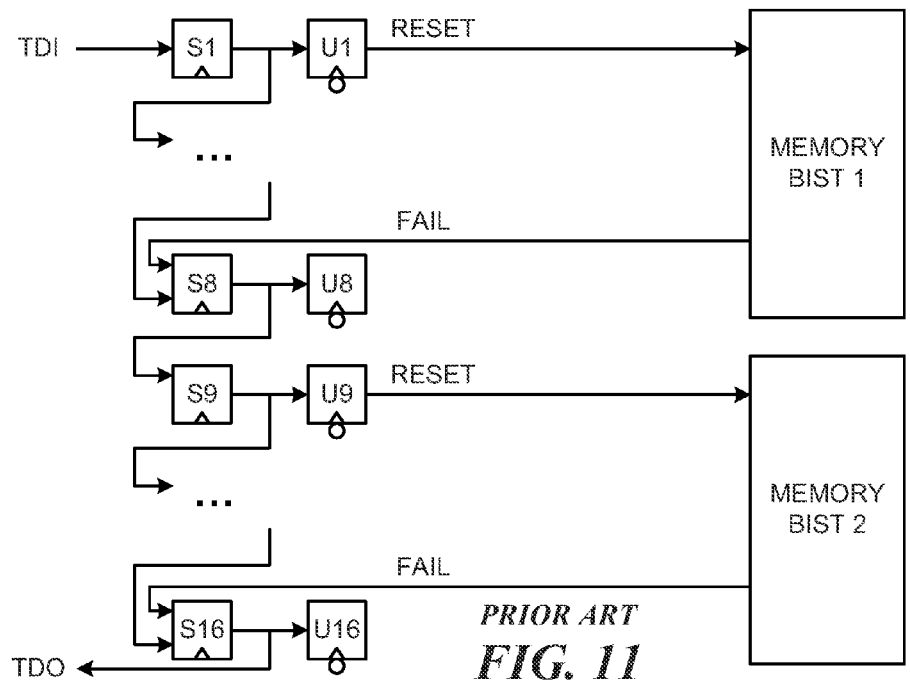
FIG. 11 depicts an example of a JTAG TDR used as an instrument interface register for two instruments.

FIG. 11 is an example of a JTAG TDR connected to two MBIST instruments. Each MBIST in FIG. 11 is exactly like the MBIST described in FIG. 9. However, the TDR depth has increased from eight bit-cells to sixteen. Current integrated circuits may have upwards of 300 or more MBIST instruments. For 300 MBIST instruments, the combined length of the TDRs could stretch to 2400 bit-cells.

Figure 12:
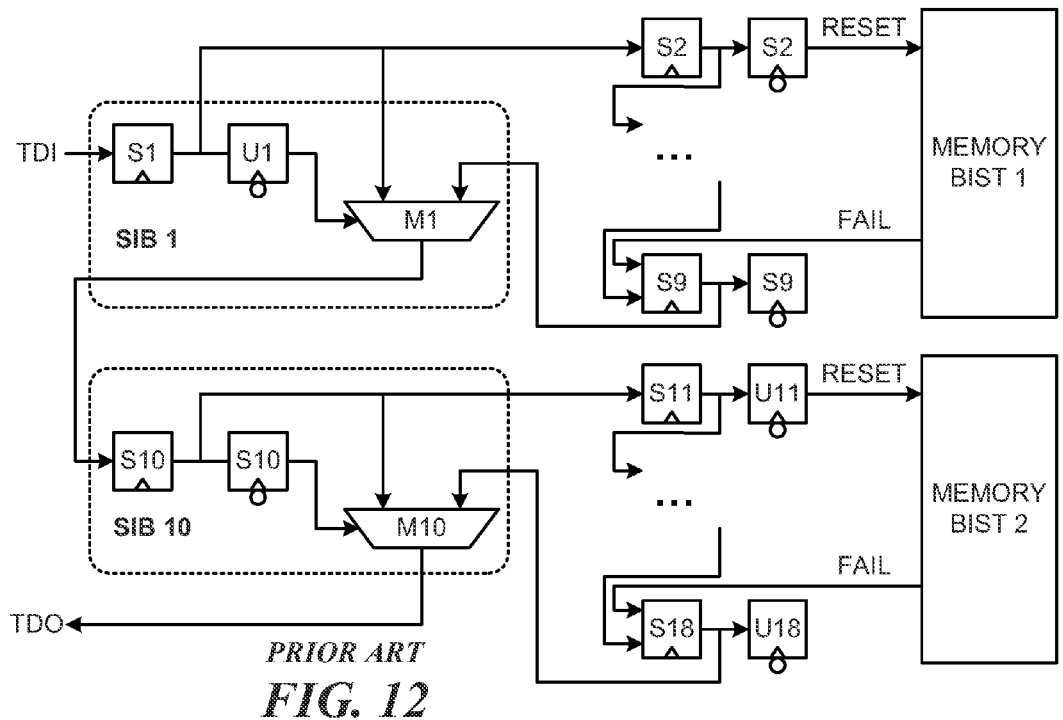
FIG. 12 depicts an example P1687 connection to two instruments using SIB Gateways.

FIG. 12 is an example of two SIB Gateways, labeled SIB 1 and SIB 10, connected to two MBIST instruments. Each SIB Gateway provides access to single MBIST. The operation of each SIB Gateway is like that described with reference to FIGS. 5 and 6. In this configuration, there are multiple options for accessing MBIST 1 and MBIST 2. MBIST 1 may be accessed alone by opening SIB 1, MBIST 2 may be accessed alone by opening SIB 2, and MBIST 1 and MBIST 2 may be accessed together by opening both SIB 1 and SIB 2. MBIST 1 and MBIST 2 may be bypassed altogether by leaving both SIB 1 and SIB 2 closed.

Figure 13:
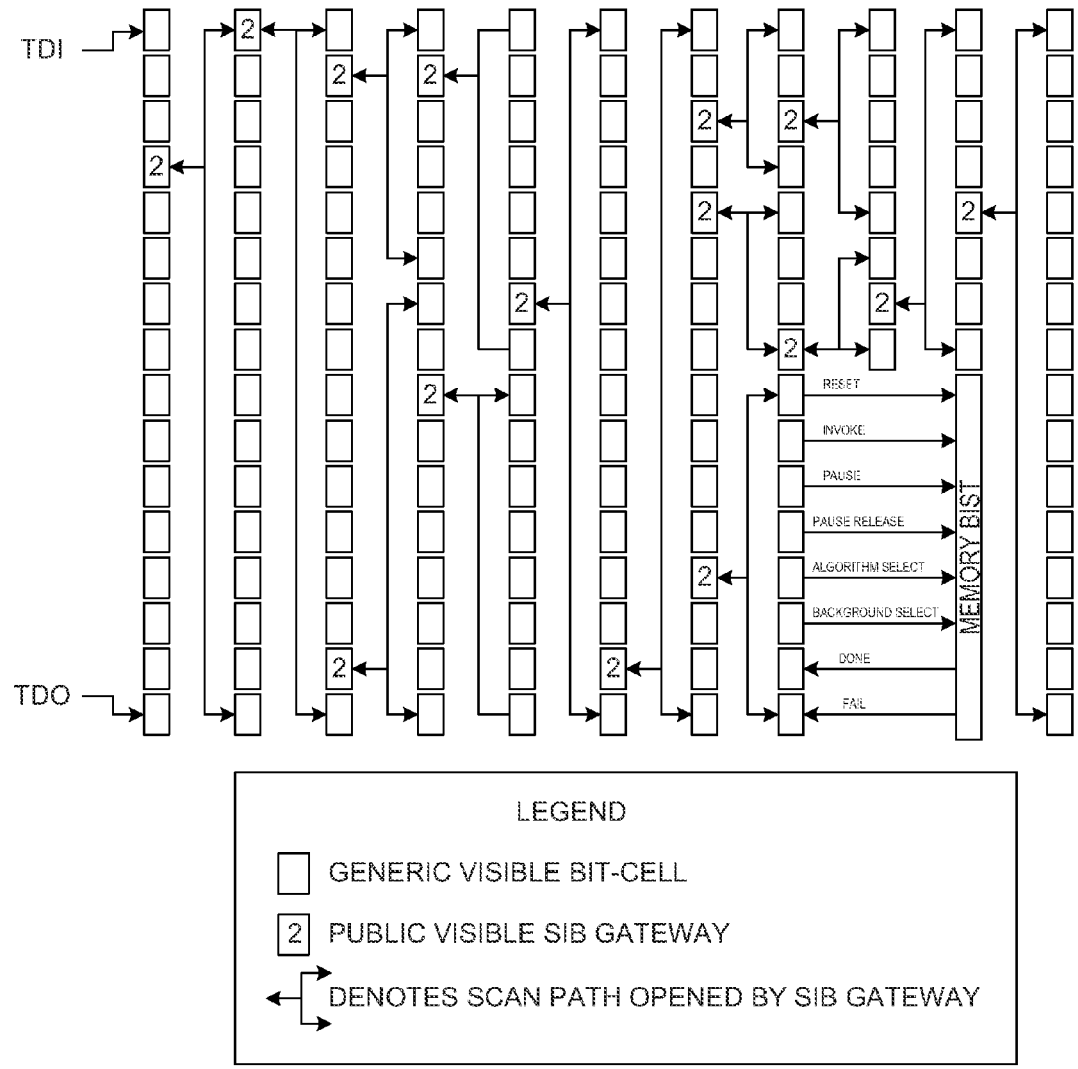
FIG. 13 depicts an example IEEE P1687 serial network having an instrument and an instrument interface register.

FIG. 13 is an example of the Memory BIST TDR in FIG. 10 integrated into a normal IEEE P1687 Network similar to that of FIG. 8. As in FIG. 8, the empty rectangles represent generic visible bit-cells. These bit-cells drive instrument signals or capture instrument output signals. Eight of these bit-cells immediately to the left of the Memory BIST represent the Memory BIST TDR.

Following the diagram from left to right starting at the TDI input into the network, seven SIB Gateways must be opened to enable access to the Memory BIST TDR. In other words, seven layers of access must be traversed before accessing the targeted Memory BIST instrument, requiring seven passes through UpdateDR in the 1149.1 FSM.

Overview of Protection of Private Instruments

A private instrument may be protected from unauthorized access by placing its instrument interface registers within a hidden scan path segment. An instrument hidden in this manner may be called a "hidden" instrument. The hidden scan path segment is hidden through special "Protection" bit-cells: Locked SIB Gateways, Key Bit-cells, and optionally Trap Bit-cells. The Locked SIB Gateway is a special type of SIB Gateway. Key Bit-cells and Trap Bit-cells are types of Network Instruction Bits (NIBs), bits which generate signals used by a IEEE 1687 network.

A Locked SIB Gateway inserts the hidden scan path segment into the scan path, but must first be "unlocked" before it may be opened. The Locked SIB Gateway is unlocked by setting Key Bit-cells to arbitrarily predefined "key values." Once the Key Bit-cells are set to the correct values, the Locked SIB Gateway is unlocked and may be opened by storing an arbitrarily predefined "gateway value" in the Locked SIB Gateway.

Trap Bit-cells may prevent the Locked SIB Gateway from being unlocked through trial and error. None of the Trap Bit-cells may be set to their arbitrarily predefined "trap values" before the SIB Gateway is opened. If any of the Trap Bit-cells is set to its trap value before the hidden scan path segment is inserted, the Trap Bit-cell will force the SIB Gateway to remain locked until a full reset of the access network.

Documenting a Locked SIB Gateway, a Key Bit-cell, or a Trap Bit-cell as such would obviously attract attention. As described above, because the rest of the network is typically publicly documented, the absence of public documentation for these bit-cells would also attract attention. A solution is to provide these bits with a second, publicly documented function. The documentation of the second function obscures the nature and purpose of these bits, providing additional protection for the private instrument interface registers in the hidden scan path segment.

The Locked SIB Gateway

Figure 14:
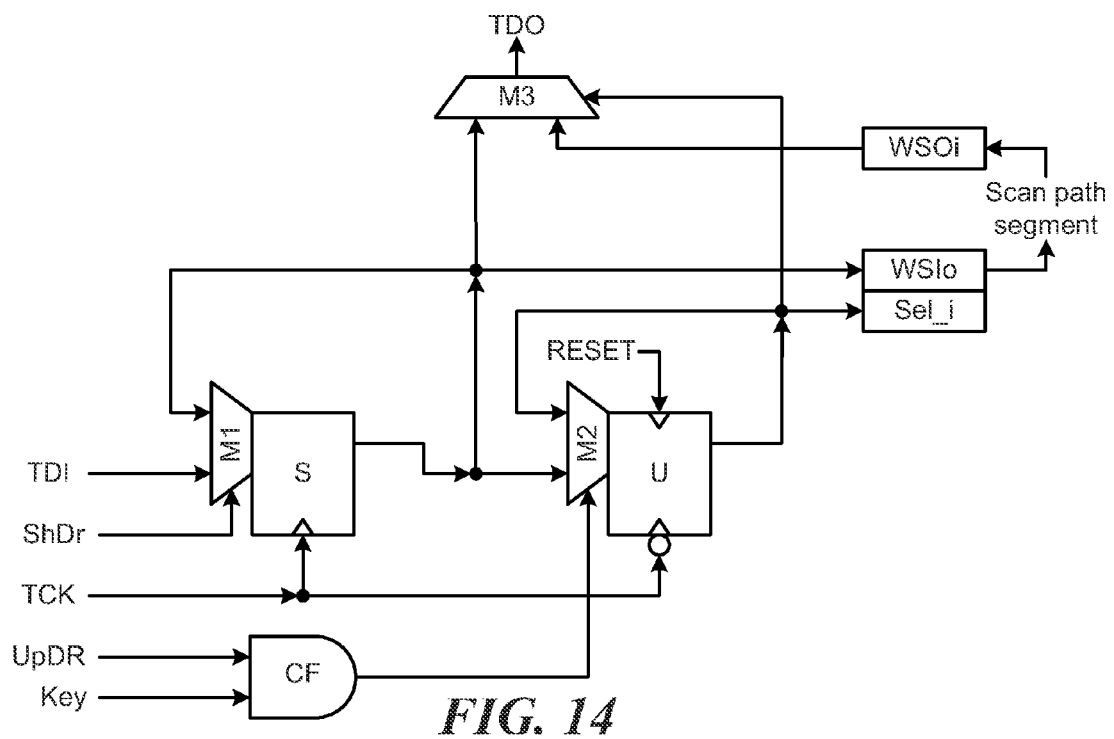
FIG. 14 depicts an example Locked SIB Gateway (LSIB Gateway)

The Locked SIB (LSIB) Gateway is a special type of SIB Gateway that will not open unless it receives one or more "Key" signals from another part of the network. The LSIB may also be called a "Locked Gateway-Bit," a "Locked SIB," or a "Locked Gateway." FIG. 14 depicts an example LSIB Gateway. An LSIB Gateway may differ from a regular SIB Gateway in that its Update element U has its UpDR signal gated with the Key signals. As shown in FIG. 14, the UpDR signal passes through a Combinatorial Function (CF) (AND gate) before reaching M2. The other input to the CF is a Key signal, which comes from another bit-cell in the network, a Key Bit-cell. Key Bit-cells will be discussed in more detail below.

The functionality of the LSIB Gateway is the same as the functionality of the SIB Gateway except that the Key signal allows or disallows activation of the HIP (WSIo, WSOi, and Sel_i) during an Update-DR operation. Accordingly, the UpDR signal cannot cause the Update element U to store a different value unless the Key signal is asserted. The LSIB Gateway is initially closed, and therefore cannot be opened without the Key signal.

The LSIB Gateway depicted in FIG. 14 requires only a single Key signal, but the UpDR signal may be gated with any number of Key signals. The Key Bit-cells for an LSIB Gateway should not be in data path segments which are opened by the LSIB Gateway, since the LSIB Gateway cannot be unlocked without accessing those bit-cells.

While the LSIB Gateway in FIG. 14 opens when a logical 1 is stored in the Update element U, an LSIB Gateway may also open when a logical 0 is stored in Update element U. The LSIB Gateway of FIG. 14 could be easily modified to open when a logical 0 is stored by inverting the output of Update element U except the output that is re-circulated back to Update element U. Because the correct value to store in an LSIB Gateway to open the gateway may be arbitrarily a 1 or 0, the correct value for a given LSIB Gateway may be called the "gateway value" for that LSIB Gateway.

The Key Bit-Cell

Figure 15:
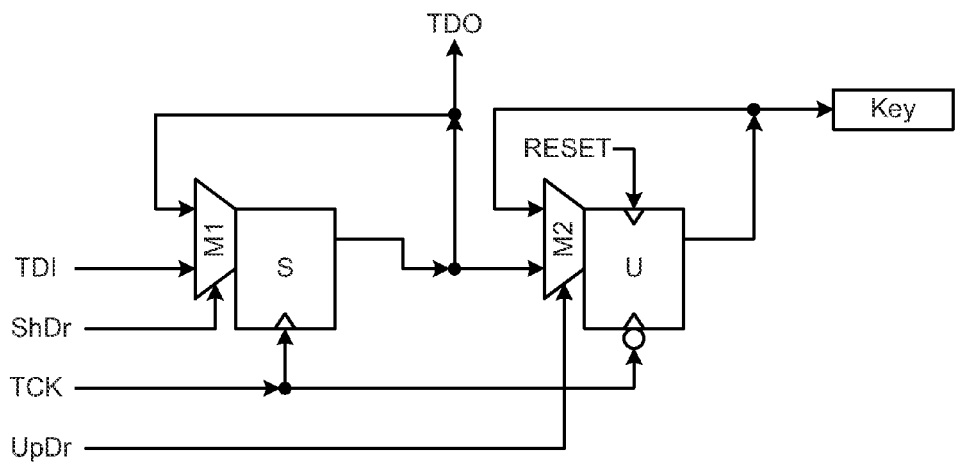
FIG. 15 depicts an example Key Bit-cell (KB)

FIG. 15 depicts an example Key Bit-cell (KB), which may also be called a "Key-Bit," an "Embedded Key-Bit," or a "Key." A KB generates a Key signal which unlocks one or more Locked SIBs, either singularly or in combination with other Key signals. A KB could be considered a Bypass Signal Generator.

The KB of FIG. 15 is similar to the SIB Gateway of FIG. 5, except that the generation of the Key signal replaces the insertion of the scan path segment. Therefore, the output of Storage element S is TDO and the output of Update element U is the Key signal. If the Reset signal is asserted, then the Key signal becomes de-asserted, thereby ensuring that any associated LSIB Gateways will remain locked.

While the KB in FIG. 15 produces the Key signal when a logical 1 is stored in Update element U, a KB may also produce the Key signal when a logical 0 is stored in Update element U. The KB of FIG. 15 could be easily modified to produce the Key signal when a logical 0 is stored by inverting the output of Update element U other than the output that is re-circulated back to Update element U. Because the correct value to store in any given KB to produce a Key signal may be arbitrarily a 1 or 0, the correct value for a given KB may be generically termed the "key value" for that KB.

The KBs may be distributed throughout the network and through multiple levels of hierarchy. An LSIB Gateway may be thought of as a multiple-number combination lock, and the KBs may be thought of as the location to enter the combination to that lock. The correct Key values must be stored in the KBs of a particular LSIB to unlock the LSIB. When the LSIB is unlocked, it may be opened to access new bit-cells.

Figure 16:
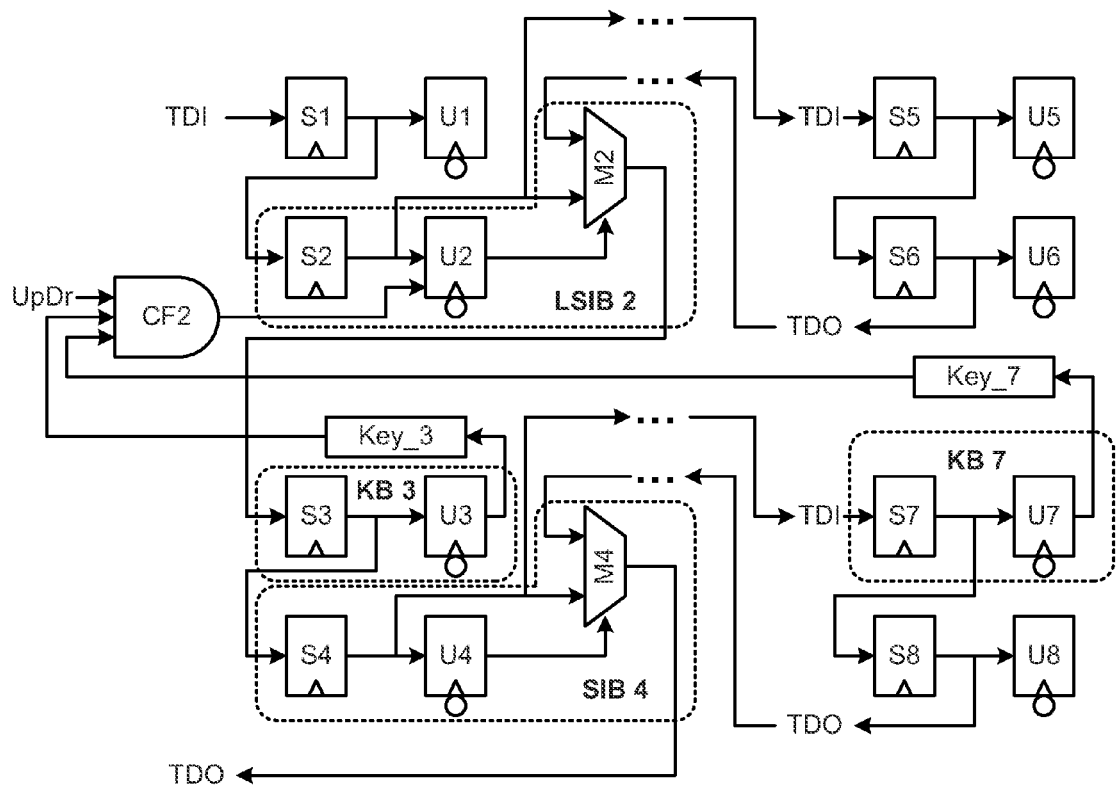
FIG. 16 depicts an example serial network having an LSIB and two KBs.

FIG. 16 is an example of a serial network that contains a Segment Insertion Bit Gateway U4, two Key Bit-cells U3 and U7, and a Locked Segment Insertion-Bit Gateway U2. Initially, only Bit-cell 1, LSIB 2, KB 3, and SIB 4 are accessible.

SIB 4 is publicly documented as a SIB and may be opened without any Key signals, allowing access to KB 7 and Bit-cell 8. By storing the correct key values in KB 3 and KB 7, LSIB 2 may be unlocked. By storing the correct gateway value in LSIB 2 to open LSIB 2, Bit-cells 5 and 6 become accessible. Bit-cells 5 and 6 may be part of an instrument interface register for a hidden instrument.

Multiple Layers of LSIBs

To provide additional protection for a hidden instrument, an LSIB Gateway may open a hidden scan path segment that contains a second LSIB Gateway, which may in turn open a second hidden scan path segment that contains a third LSIB Gateway, and so on. As an example, to unlock a LSIB Gateway, a network may be first operated with Shift-DR operations followed by an Update-DR operation to place the first number or encoded value in a first set of Key Bit-cells. The first number may be a set of register encodings and may be a set of one-hot bits. Storing the first number in the first set of Key Bit-Cells may unlock a first LSIB Gateway, which may then be opened to gain access to additional bit-cells, including a second set of Key Bit-Cells.

Next, the network may be operated to re-position the first number in the first set of Key Bit-cells and to place a second number or encoded value in the second set of Key Bit-Cells. This operation may unlock a second LSIB Gateway, which may be opened to gain access to even more additional bit-cells. These additional bit-cells may be called "doubly-hidden" bit-cells because they are hidden behind two LSIBs.

The doubly-hidden bit-cells might include a third set of Key-Bits. The network could again be operated with Shift-DR operations and an Update-DR operation to re-position the first two numbers and to then place a third number in the third set of Key-Bits. This operation could unlock a third LSIB, which could be opened to access "triply-hidden" bit-cells, and so on up to the level of security that has been installed into the access architecture. When the final LSIB Gateway is opened, a hidden scan path segment containing one or more hidden instrument interface registers is inserted into the scan path. Other hidden instrument interface registers could be hidden behind fewer LSIB Gateways, but the registers hidden behind the final LSIB Gateway would be the most difficult to access.

Placing an instrument's interface registers behind just a single LSIB Gateway provides the instrument with protection from unauthorized access. However, placing multiple "layers" of LSIBs between the initial scan path and the instrument interface registers provides added protection. As an example, a minimum "depth" of 128 LSIBs may be considered sufficient to protect some instruments. A curious or malicious person seeking to access these instruments would have to unlock and open 128 LSIBs to reach the instrument interface registers.

Figure 17:
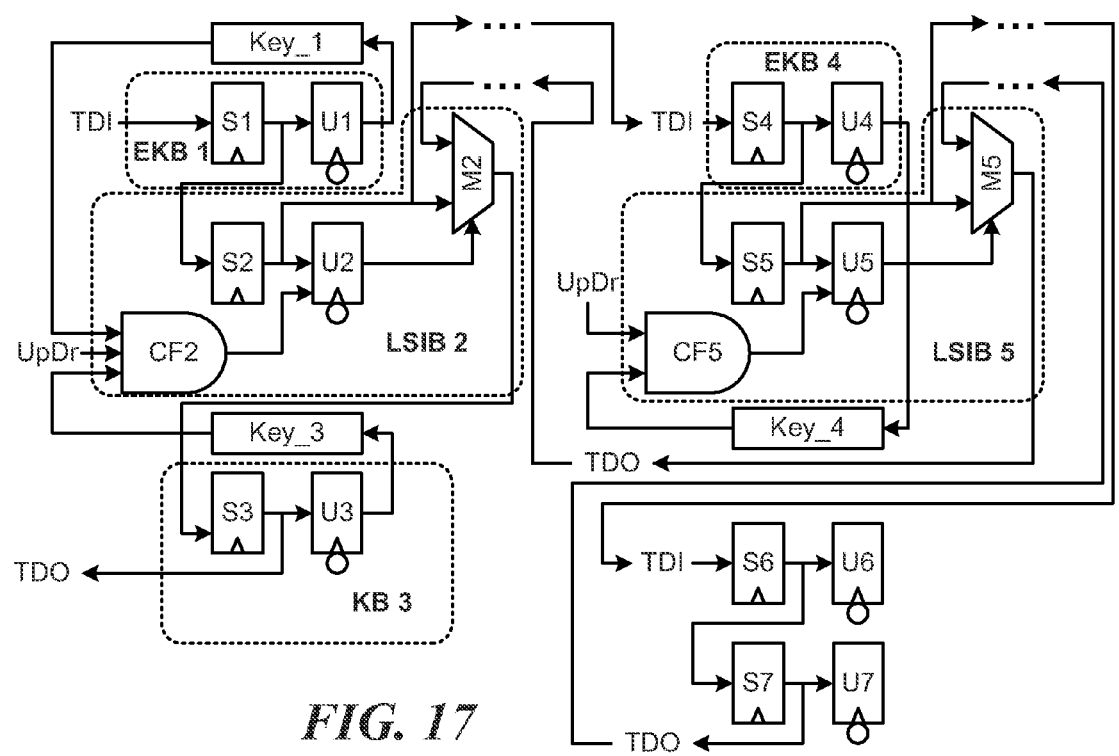
FIG. 17 depicts an example serial network having doubly-hidden bit-cells.

FIG. 17 is an example of an architecture containing doubly-hidden bit-cells. The serial network depicted in FIG. 17 contains KBs U1, U3, and U4, LSIB U2, and doubly-hidden LSIB 5. CF2 and CF5 are combinatorial functions (AND gates). The multiple layers of locked access in this network hide the doubly-hidden Bit-cells 6 and 7.

Initially, only KB 1, LSIB 2, and KB 3 are accessible. To access KB 4 and LSIB 5, correct key values must be stored in KB 1 and KB 3. The correct gateway value must then be stored in LSIB 2 to insert the data path segment containing KB 4 and LSIB 5. To access Bit-cells 6 and 7, the correct key value must be stored in KB 4 and the correct gateway value must then be stored in LSIB 5. LSIB 5 will the insert the data path segment containing Bit-cells 6 and 7. Because a typical access network contains many bit-cells with no relation to hidden data path segments, finding which bit-cells are KBs and LSIBs, then finding the correct values to place in those bit-cells, may be extremely difficult.

The Trap Bit-Cell

A further step of security may need to be applied if curious or malicious persons are aware of the dual purpose of some of the bit-cells, or are aware that some of the bit-cells may act as Key Bit-cells to unlock the dual purpose bit-cells. The curious or malicious persons may attempt to apply random or directed values to the visible bit-cells in the scan path network to see if these values unlock any hidden capabilities or private areas. For example, a common practice when attempting to reverse engineer chips that have scan paths is "walking a one" through the scan path. In the case of an IEEE 1149.1 compatible scan path, such as that used by an IEEE 1500 Core Wrapper or an IEEE 1687 network, "walking a one" means applying a logical 1 to the scan path using the Shift-DR operation to the scan path bit-cell under investigation, while placing known or default values to other bit-cells. This operation is followed by the Update-DR operation to investigate whether the logical 1 in the Bit-cell changes the network behavior, or seems to have no effect, after an update operation.

To prevent the discovery of Key Bit-cells or LSIB Gateways, active stumbling blocks may be put in place, similar to placing a minefield around an important military target. These stumbling blocks are known as "Trap Bit-cells" or "traps." When activated by storage of a certain value, a Trap Bit-cell prevents an associated LSIB Gateway from being opened. There may be different types of Trap Bit-cells. In one embodiment, a Trap Bit-cell disables or bypasses one or more Key Bit-cells, preventing the Key Bit-cells from transmitting their respective Key signals. In another embodiment, a Trap Bit-cell directly prevents an associated LSIB Gateway from opening.

A Trap Bit-cell may be activated when a targeted value, such as a logical 1, is walked through a scan path with repeated Update Operations and the logical 1 undergoes an Update Operation while in the Shift cell of a Trap Bit-cell. The logical 1 will be stored in the Trap Bit-cell, disabling the associated LSIB Gateway, until the access network undergoes a full reset. Therefore, any directed effort to investigate the network for hidden scan paths will actively disable the Key system.

Figure 18:
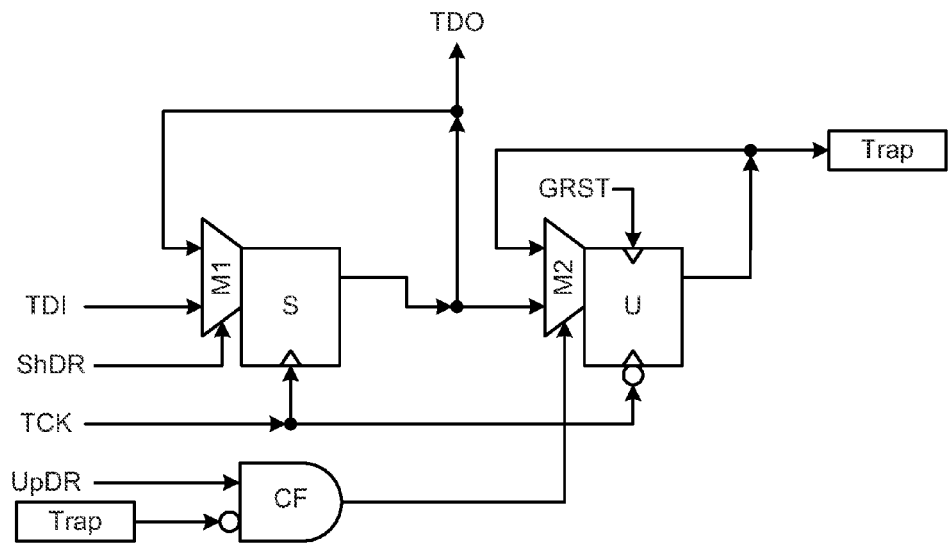
FIG. 18 depicts an example Self-Locking Trap Bit-cell (SLTB)

FIG. 18 is an example of a Trap Bit-cell (TB), which may also be called a "Trap-Bit" or a "Trap." The purpose of the TB is to prevent one or more Update elements necessary to unlock an LSIB Gateway from changing state while a Trap signal is asserted. The TB is essentially a "signal generation" bit-cell that creates a Trap signal that is used to self-lock itself, so that only a global network reset may unlock the bit-cell. The Trap signal is a special network signal that may be used to lock or bypass certain Key Bit-cells that produce the Key signal for Locked SIB Gateways, or to directly disable a Locked SIB Gateway.

The TB of FIG. 18 is similar to the KB of FIG. 15. The TB has a Trap signal as output instead of a Key signal. The TB in FIG. 18 is "self-locking," so it is a Self-Locking Trap Bit-cell (SLTB). The SLTB is "self-locking" because its UpDR signal is gated with its inverted Trap signal. CF is a combinatorial function (AND gate) with UpDR and the inverted Trap signal as inputs. When a logical 1 is stored in Update element U, the Trap signal is asserted and the SLTB will enter a self-locking state. A Self-Locking Trap Bit-cell may also be called a "Feedback" Trap Bit-Cell because the Trap signal feeds back to the UpdateDR input gate.

While the KB Update element of FIG. 15 had a Reset input, the SLTB of FIG. 18 has a Global Reset (GRST) input. A Global Reset result in Update element U being reset to a state where the Trap signal is de-asserted. Therefore, once a SLTB is activated, the Lock signal will remain asserted until a Global Reset.

However, the assertion of the Global Reset signal will reset the entire 1687 network to an initial state, so any investigation up to that point will be lost. Typically, in the initial state all SIBs, including LSIBs, will be closed and all LSIBs will be locked. If the chip having the 1687 network is on a system board, a Global Reset signal may be a reset of the entire board, resetting every chip on the board to an initial state. In this case, investigating the 1687 network without attracting attention will be more difficult because the repeated assertions of the Global Reset signal will be very noticeable to others.

Not all TBs must be self-locking. If UpDR were transmitted directly to M2, rather than gated with the Trap signal, the TB of FIG. 18 would not be self-locking. The Trap signal could be de-asserted by storing a logical 0 in Update element U.

While the TB in FIG. 18 produces the Lock signal when a logical 1 is stored in Update element U, an TB may also produce the Lock signal when a logical 0 is stored in Update element U. The TB of FIG. 18 could be easily modified to produce the Lock signal when a logical 0 is stored by inverting the output of Update element U other than the output that is re-circulated back to Update element U. Because the correct value to store in any given TB to produce a Trap signal may be arbitrarily a 1 or 0, the correct value for a given TB may be generically termed the "Trap value" for that TB.

The Trapped Key Bit-Cell

Figure 19:
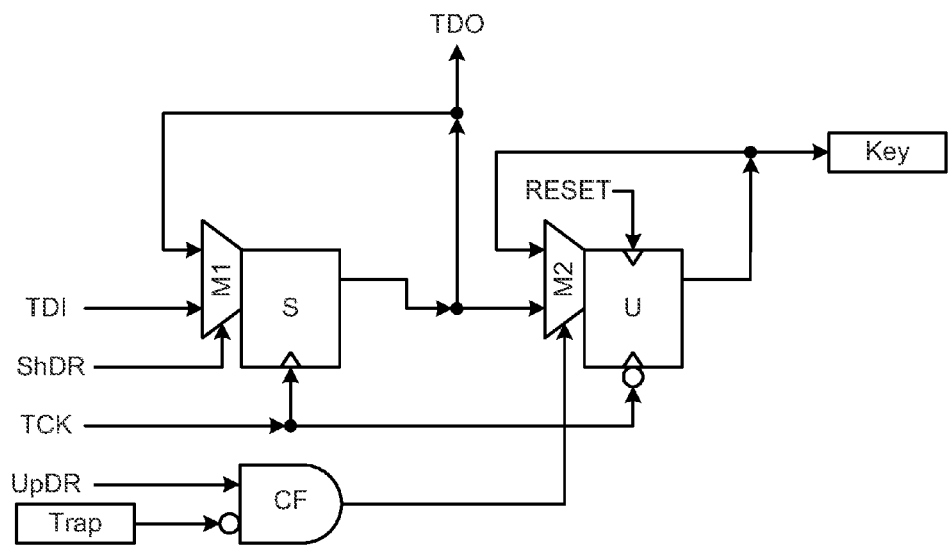
FIG. 19 depicts an example Trapped Key Bit-cell (TKB)

FIG. 19 is an example of a Trapped Key Bit-cell (TKB), a Key Bit-cell which will not transmit a Key signal if an associated Trap Bit-cell has been activated. The TKB in FIG. 19 is identical to the KB in FIG. 15 except that the UpDR signal is now gated by a Trap signal from the associated TB.

Until the Trap signal is asserted, the TKB functions as a KB. When the Trap signal is asserted, the Trap signal effectively prevents the value stored in Update element U from changing. If a correct Key value was not already stored in Update element U, the correct Key value cannot be stored until the Trap signal is de-asserted, which may require a global reset.

Figure 20:
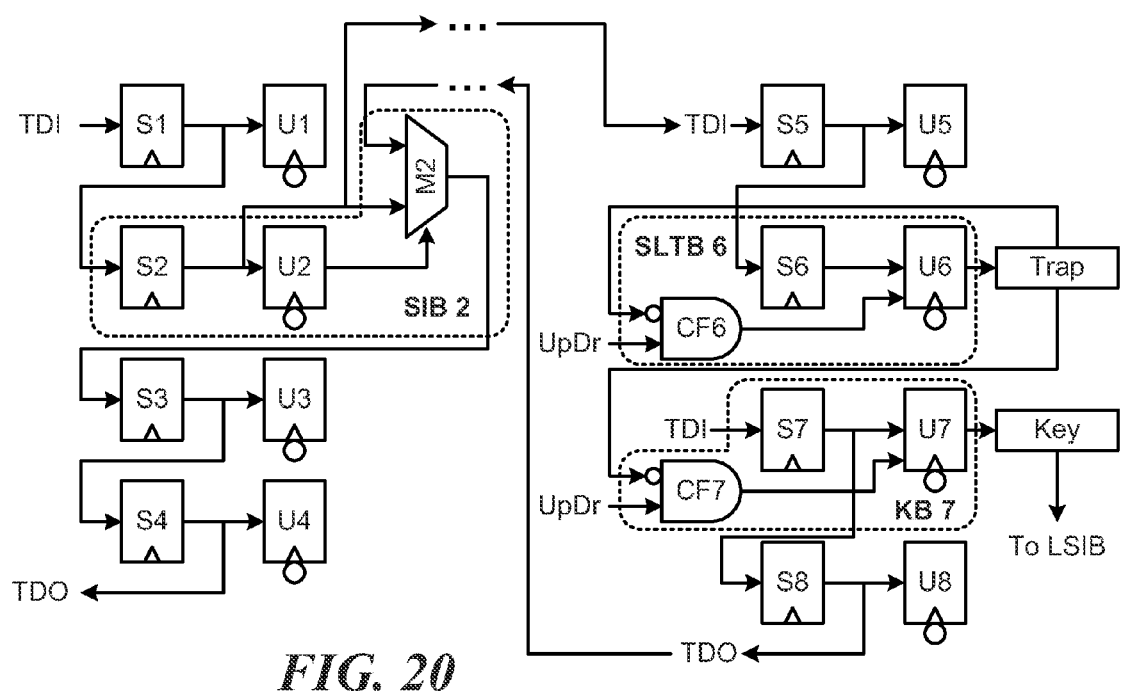
FIG. 20 depicts an example serial network having a SLTB and a TKB.

FIG. 20 is an example of a network that contains a SIB Gateway (SIB 2), a Self-Locking Trap Bit-cell (SLTB 6), and a Trapped Key Bit-cell (TKB 7). The Key signal from TKB 7 is transmitted to an LSIB Gateway. M2 is a multiplexer. Elements CF6 and CF7 are combinational functions (AND gates). SIB 2 opens and closes access to Bit-cells 5 through 8.

SLTB 6 locks itself, preventing KB 7 from storing a different value, if a walking-1 or other investigative pattern is applied to the network and a 1 is stored in SLTB 6. KB 7 then cannot store a 1 and create the Key signal necessary for an LSIB to provide access to hidden scan path segment. The Trap signal may deny the UpDR signal as in FIG. 18 or may assert U7's Reset signal. Once the Trap signal is asserted, Update elements U6 and U7 retain their state until a global reset, which will reset the Trap signal. KB 7 could also be reset to its initial value by asserting the reset signal of KB 7, but the initial value for a KB would typically not be the Key value.

In another embodiment, instead of preventing an asserted UpDR signal from reaching the Update element, a Trap signal may remove a TKB from the scan path. The Trap signal may also insert a "dummy" Bit-cell into the scan chain to replace the TKB. Without the dummy Bit-cell, the length of the scan path would change and potentially indicate that the Trap signal is asserted.

Interaction of LSIB Gateways, SLTBs, and KBs

Three types of Protection Bit-cells are outlined above: the LSIB Gateway, the KB, of which the TKB is a variation, and the TB, of which the SLTB is a variation. A bit-cell in one of the three categories may be associated with one or more bit-cells in the other two categories. In other words, a single LSIB Gateway may require Key signals from multiple KBs to unlock it, and Trap signals from any of multiple SLTBs may prevent the LSIB Gateway from opening. A single KB may transmit a Key signal to multiple LSIB Gateways, and the KB may be disabled or bypassed by multiple TKBs. A single TB may disable or bypass multiple KBs, and may prevent multiple LSIBs from opening.

A scan path segment inserted by a basic SIB may hide Protection Bit-cells. This was shown in FIG. 16, where SIB 4 inserted a scan path segment containing KB 7. It is possible that opening an LSIB may require opening one or more publicly available SIBs.

A network may be a very simple network with just a few instruments that are accessed through public scan paths, and with only one hidden scan path to access a hidden register that is used as a hidden instrument interface. The network also may be very sophisticated, with multiple sub-networks of public instruments, many hidden scan path segments, and many hidden instrument interfaces accessible through many separate systems of LSIB Gateways and KBs.

A TB does not necessarily require an TKB to prevent an LSIB Gateway from unlocking Instead of transmitting the Trap signal to a TKB, the UpDR of the LSIB Gateway could be gated with the inverted Trap signal. In this case, the LSIB Gateway, rather than a TKB, is prevented from storing a different value when the Trap signal is asserted.

As described above, the Key and Trap signals may be gated respectively with the UpDR signals of an LSIB Gateway and a TKB. In these cases, a de-asserted Key signal or an asserted Trap signal does not directly prevent an LSIB Gateway from opening or a TKB from transmitting a Key signal. Rather, they prevent the LSIB Gateway or TKB from storing a different value.

Therefore, for an LSIB Gateway which is already open, de-asserting a Key signal does not close the LSIB Gateway. Rather, it locks the LSIB Gateway in an open state. The Update element U of an open LSIB Gateway stores the LSIB Gateway's gateway value. Because of the gated UpDR, the LSIB Gateway cannot store a different value to close the LSIB Gateway until the Key signal is asserted again. Alternately, the Reset signal of the LSIB Gateway may be asserted, causing the LSIB Gateway to reset to its initial closed state.

Similarly, for a TKB which is already transmitting its Key signal, activating an associated TB does not cause the TKB to stop transmitting its Key signal. Instead, the Trap signal from the TB prevents the Update element U of the TKB from changing state. A different value cannot be stored in the TKB to stop the TKB from transmitting the Key signal. Instead, either the TKB must be reset to its initial state, which will reset the value stored in the TKB, or the Trap signal must be de-asserted. If the TB is a SLTB, de-asserting the Trap signal would require a global reset.

The Addition of a Capture Function

The fact a bit-cell is a Protection Bit-cell should be hidden. Otherwise, the bit-cell will appear in the scan path with no observable purpose, attracting attention. A typical scan path has a multitude of Capture-Shift Only bit-cells similar to the Capture-Shift Only bit-cell shown in FIG. 4. These bit-cells exist for various purposes, including internal scan chain captures to verify the integrity of the scan chain. Every bit in the scan path could potentially capture an internal value to facilitate various forms of logic analyzer functionality. By disguising the Protection Bit-cells as these Capture-Shift Only bit-cells, a curious or malicious person will have difficulty identifying which bit-cells are relevant to accessing hidden instruments.

Each type of Protection Bit-cell has both a Shift element and an Update element, but only the value stored in the Update element affects the function of the Protection Bit-cell. A Capture-Shift Only bit-cell has only a Shift element. Therefore, combining a Protection Bit-cell with a Capture-Shift Only bit-cell may produce a bit-cell that appears to be a Capture-Shift Only bit-cell, but which also functions as a Protection Bit-cell. These resulting bit-cells may be referred to as "Capture" Protection Bit-cells: Capture LSIBs, Capture KBs or TKBs, and Capture TBs or SLTBs.

Figure 21A:
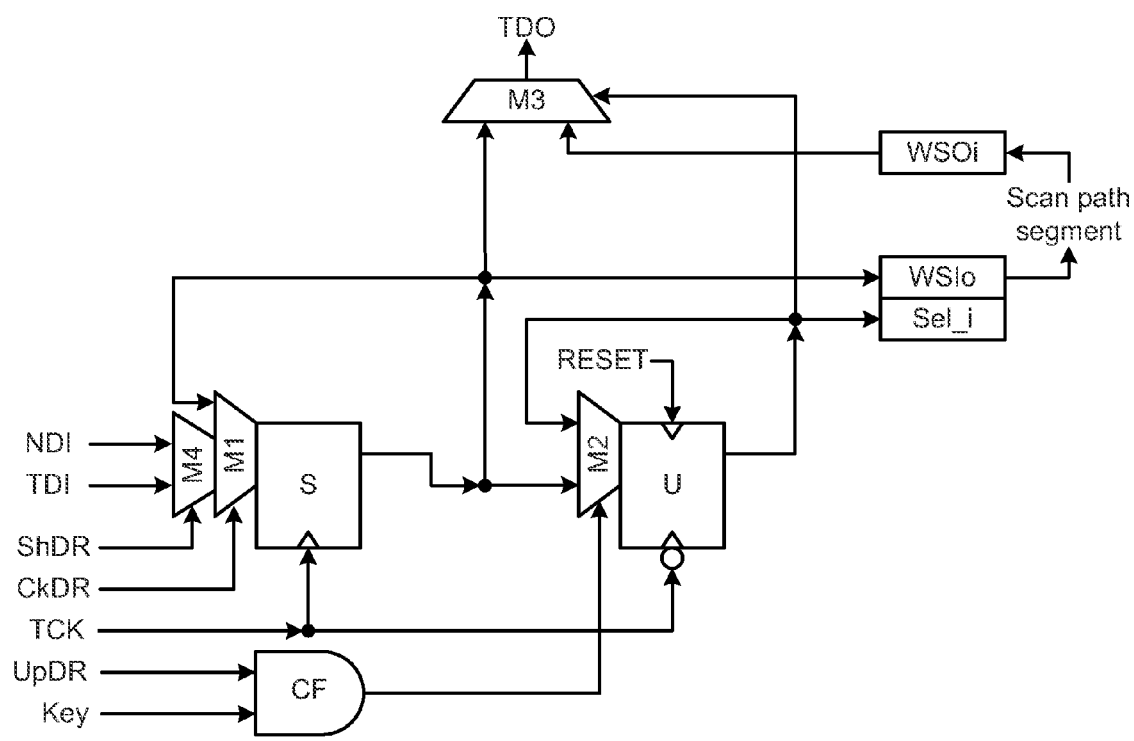
FIG. 21A depicts an example Capture LSIB Gateway.
Figure 21B:
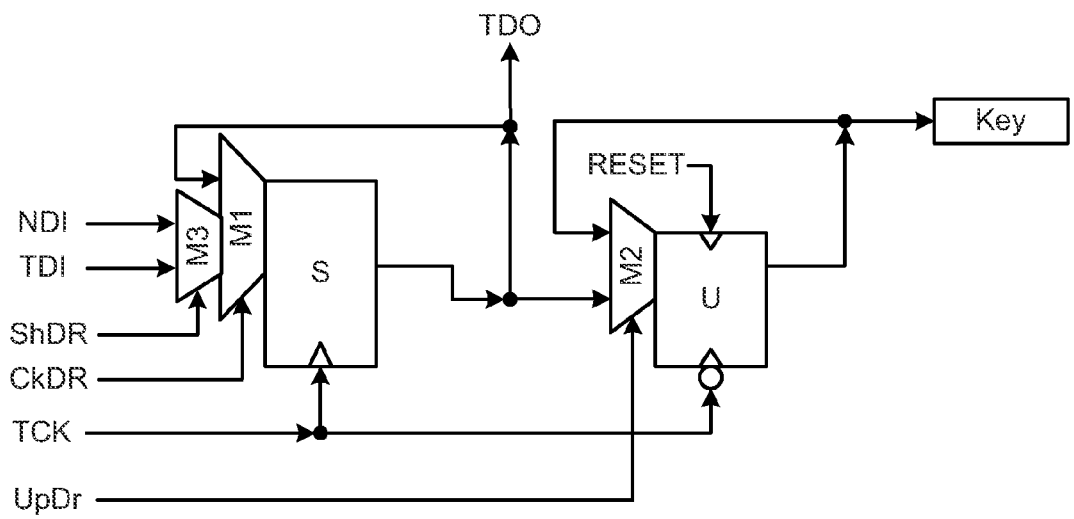
FIG. 21B depicts an example Capture KB.
Figure 21C:
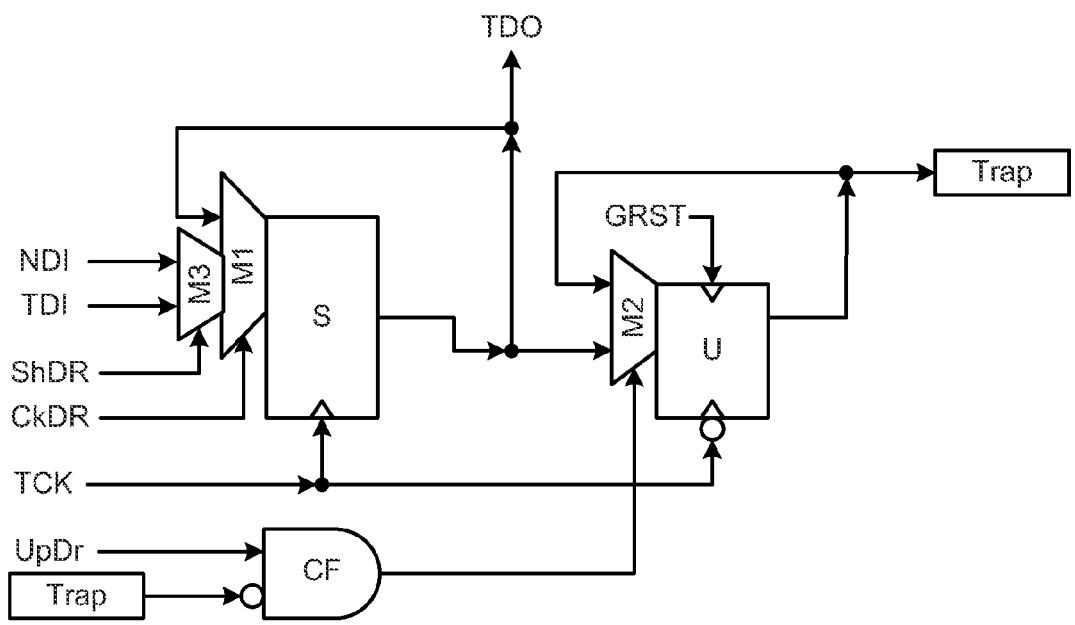
FIG. 21C depicts an example Capture SLTB.

FIGS. 21A-21C respectively depict a Capture LSIB, a Capture KB, and a Capture SLTB. The new signals are NDI (normal data input) and CkDR (clock DR), both equivalent to the NDI and CkDR signals in FIG. 4. In addition, another multiplexer, M4 in FIG. 21A and M3 in FIGS. 21B and 21C, has been added. This multiplexer is equivalent to multiplexer M2 in FIG. 4. The Capture KB in FIG. 21B may be converted into a Capture TKB by gating the UpDR signal with an inverted Trap signal, as in FIG. 19. Likewise, the SLTB in FIG. 21C may be converted into a non self-locking Capture TB by not gating the UpDR signal with the inverted Trap signal.

In FIGS. 21A-21C, the Shift element is used as a Capture bit-cell for other data generated by the network or by a public instrument. The Capture Protection Bit-cell then has a dual purpose, functioning as both a Capture-Shift Only bit-cell and as a Protection Bit-cell. In the public documentation, the Capture Protection Bit-cell is only documented as a Capture-Shift Only bit-cell like the Capture-Shift Only bit-cell depicted in FIG. 4. Until the a Gateway value, Key value, or Trap value is stored in the bit-cell, the Capture Protection Bit-cell acts as a Capture-Shift Only Bit-cell.

The Capture-Shift Only function disguises a Capture Protection Bit-cell, hiding the existence of the Update element and allowing the bit-cell to appear in the public documentation as any other Capture-Shift Only bit-cell. The bit-cell behaves as it is publicly documented, so the Capture Protection Bit-cell will not attract attention even if a curious or malicious individual tests the Capture Protection Bit-cell against the documentation. Note that a typical IEEE 1687 network has numerous Capture-Shift Only bit-cells which are for internal use, so it is almost impossible to determine if what is captured in a Capture-Shift Only bit-cell has an actual meaning inside the chip. Because of the disguise advantage of the Capture Protection Bit-cells, it is preferable to use the Capture variations in chip designs.

In accordance with the documented second function, the KBs may perform a Capture of instrument or network data. Some KBs should capture their Key value and some KBs should not capture their Key value, to avoid creating a perception that KBs will always capture or not capture their Key value.

In a network with multiple layers of LSIBs, only the first layer, the initially accessible scan path containing the first LSIB or LSIBs, would typically be publicly documented as all the other layers are hidden from the public. A bit-cell having no public documentation would obviously not have a publicly documented function. However, no bit-cell in a layer having no public documentation would attract particular attention, as there is an absence of public documentation for every bit-cell in the layer.

Example Serial Network

Figure 22:
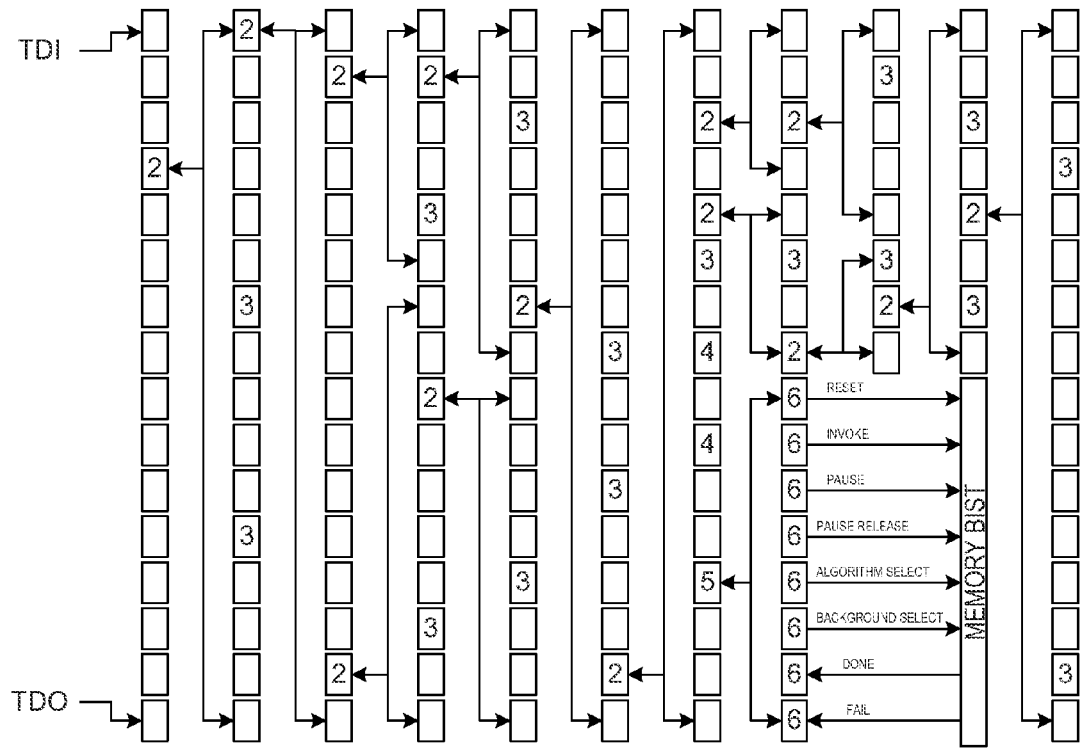
FIG. 22 depicts an example serial network having Protection Bit-cells.
Figure 22:
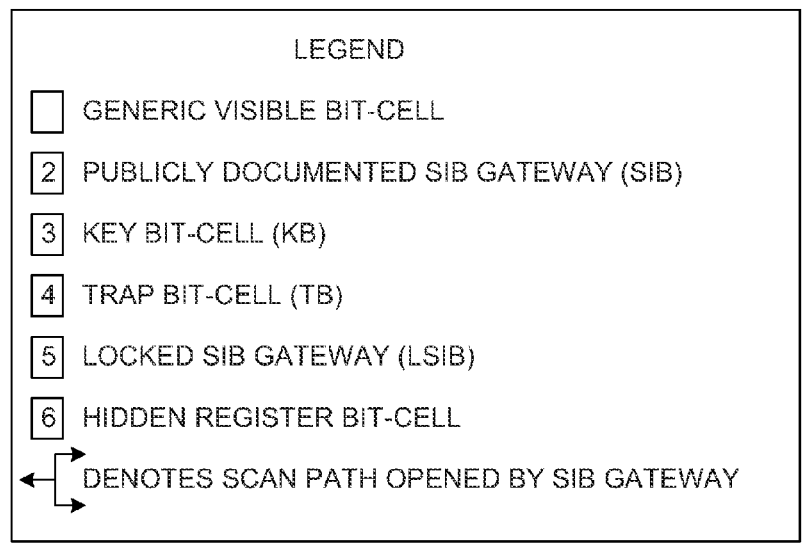

FIG. 22 is an example of a Serial Network that contains a hidden MBIST instrument. The empty rectangles represent generic instrument interface bit-cells which are part of a visible public register or registers. The rectangles labeled "2" represent publicly documented SIB Gateways. The rectangles labeled "3" represent Key Bit-cells, each of which may or may not be Trapped Key Bit-cells. The rectangles labeled "4" represent Trap Bit-cells, each of which may or may not be Self-Locking Trap Bit-cells. The rectangle labeled "5" represents an LSIB Gateway. The rectangles labeled "6" represent the bit-cells of a register hidden from the public because it is the instrument interface register for the MBIST. The Protection Bit-cells are preferably Capture Protection Bit-cells.

In the example network of FIG. 22, the Memory BIST instrument is a hidden instrument which is accessed by the Hidden Register Bit-cells 6. The Hidden Register Bit-cells 6 are part of a segment which is inserted into the scan path by LSIB Gateway 5. For LSIB Gateway 5 to "unlock," permitting insertion of the segment containing Hidden Register Bit-cells 6, the sixteen Key Bit-cells 3 must be set to their correct Key values. The correct Key value for each Key Bit-cell 3 may be determined arbitrarily. In addition, none of Trap Bit-cells 4 may be set to its Trap value. The Trap value for each Trap Bit-cell 4 may also be determined arbitrarily.

If any Trap Bit-cell 4 is set to a Trap value, the Trap Bit-cell 4 may preclude the LSIB Gateway 5 from unlocking. If the Trap Bit-cell 4 is a Self-Locking Trap Bit-cell, unlocking the LSIB Gateway 5 may then require a global network reset and a re-operating of the network to install all the correct SIB, LSIB, and KB values.

If all Key Bit-cells 3 are set to correct values and no Trap Bit-cells 4 are set to incorrect values, LSIB Gateway 5 is unlocked. The hidden scan path segment containing Hidden Register Bit-cells 6 may then be inserted into the scan path when LSIB Gateway 5 is set to its Gateway value, which may again be determined arbitrarily. The insertion of the segment permits access to Hidden Register Bit-cells 6 and, through them, the hidden Memory BIST instrument.

Figure 23:
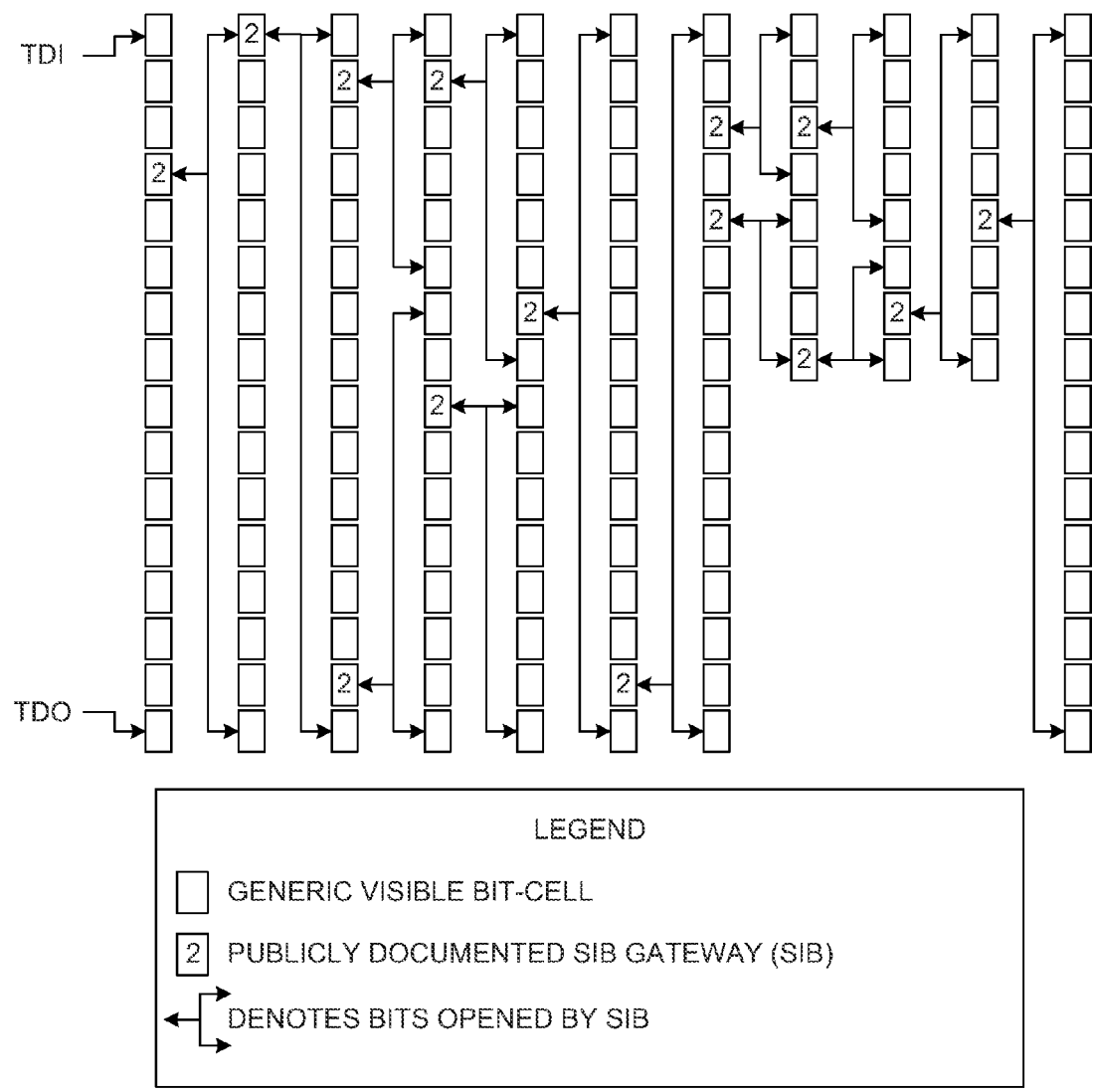
FIG. 23 depicts an example of public documentation for the serial network of FIG. 22.

FIG. 23 depicts how the example network of FIG. 22 would appear in public documentation. The existence of the Memory BIST and Hidden Register Bit-cells 6 does not appear in the documentation. Key Bit-cells 3, Trap Bit-cells 4, and LSIB Gateway 5 are shown in the documentation, but as generic instrument interface bit-cells. These bit-cells also function as generic instrument interface bit-cells, making them difficult to distinguish from the other bit-cells in the network.

To utilize the hidden Memory BIST instrument, one must therefore know the location of the Key Bit-cells 3, the correct Key values for each of those bit-cells, the location of LSIB Gateway 5, and the correct Gateway value to cause LSIB Gateway 5 to insert the hidden scan path segment. Determining this information through trial and error is difficult because a Trap value may be stored in one of Trap Bit-cells 4. The Trap value may prevent LSIB Gateway 5 from opening, and may do so without providing any indication. A Self-Locking Trap Bit-cell 4 may prevent LSIB Gateway 5 from opening until a full network reset without providing any indication.

Documentation of Access to Hidden Instruments

The above discussion has described a method of preventing unauthorized individuals from accessing hidden instruments. However, authorized individuals may still need to access the hidden instruments. Therefore, private documentation should be created documenting the bit-cell locations and bit-cell types of all the bit-cells that influence operation of the network. Knowledge of this private documentation should be kept internally by the company which designed the embedded instrument access network. The private documentation should contain the locations of the Protection Bit-cells (Locked SIB Gateways, Key Bit-cells, and Trap bit-cells), and the associated Gateway values, Key values, and Trap values.

For security, the private documentation may be stored in an encrypted electronic format. By controlling access to the private documentation, an IC designer may restrict or limit access to the hidden instruments to authorized persons. An IC designer may wish to prevent authorized persons from disseminating the private documentation, and may wish to have the power to revoke the authorization of an authorized person. With these capabilities, an IC designer may license and revoke access to the hidden instruments as it wishes.

Figure 24:
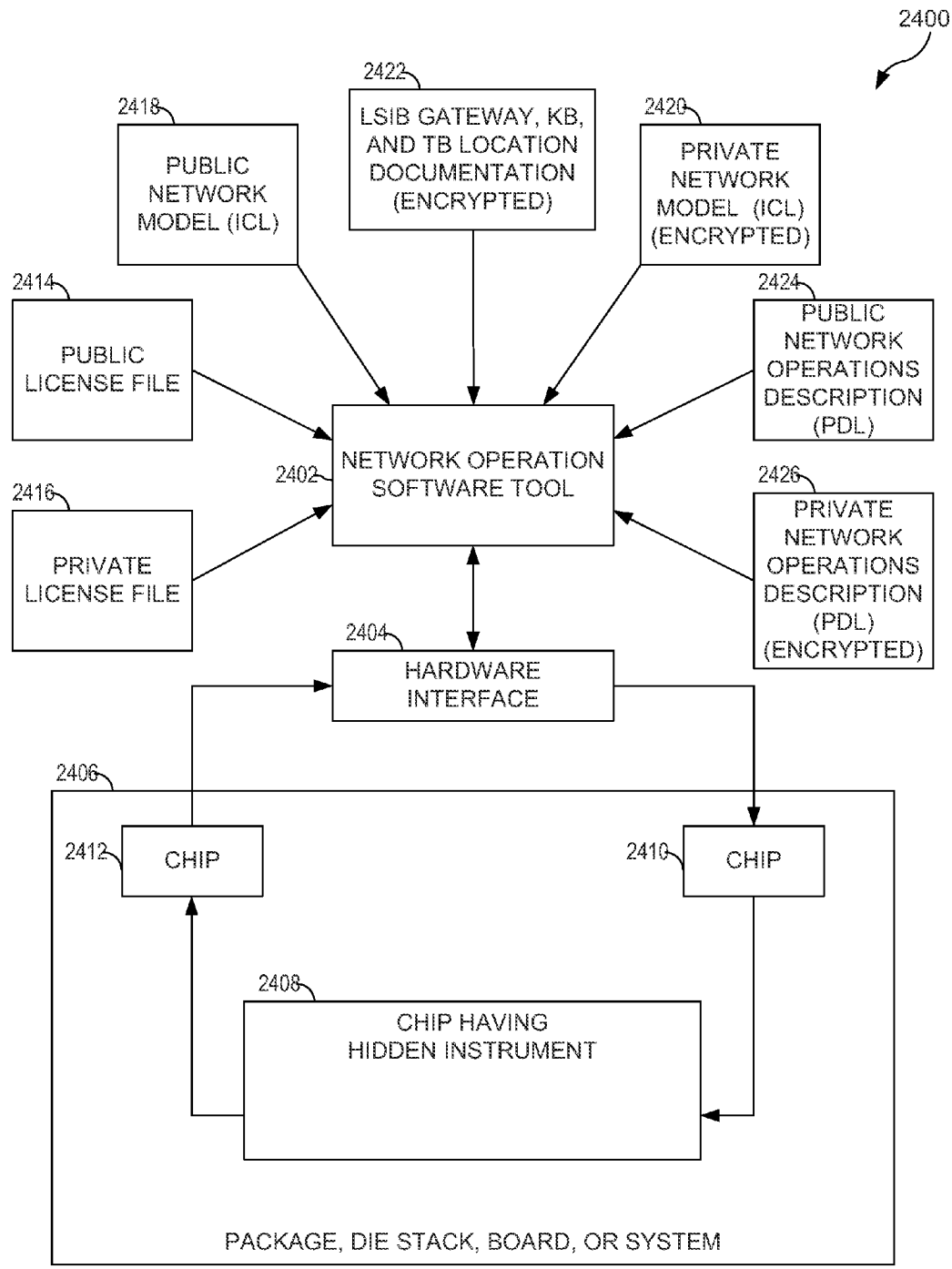
FIG. 24 depicts an example network operation software tool architecture.

Accordingly, the private documentation may be provided in an encrypted form which is readable by a network operation software tool. FIG. 24 depicts an exemplary architecture 2400 for a Network Operation Software Tool 2402. Network Operation Software Tool 2402 may be designed so that it is not specific to any network. Instead, Network Operation Software Tool 2402 may utilize network model files containing the information needed to utilize a specific network.

Network Operation Software Tool 2402 may operate on a computer which has a Hardware Interface 2404 to the package, die stack, board, or system 2406 containing one or more instruments for the software tool to operate. Network Operation Software Tool 2402 may transmit signals to Hardware Interface 2404 without informing the user of the content of the signals. The Chip 2408 having the hidden instrument a user wishes to operate may be preceded in the scan chain by one or more Chips 2410 and followed in the scan chain by one or more Chips 2412. Chips 2410 and 2412 may or may not also contain hidden instruments.

In operation for a given network, Network Operation Software Tool 2402 may first determine which instruments the user is authorized to access by checking for Public License File 2414 and Private License File 2416. The IC designer may provide a user authorized to access public instruments with Public License File 2414. The IC designer may provide a user authorized to access private instruments with Private License File 2416. From these files, Network Operation Software Tool 2402 may determine which instruments the user is authorized to operate.

Network Operation Software Tool 2402 may consult two different network models. Public Network Model 2418 may be an ICL file which describes the network as it is shown in publicly available documentation, without any hidden instruments. Private Network Model 2420 may be an ICL file which describes the portions of the network omitted from Public Network Model 2418, including hidden instruments. In addition, Network Operation Software Tool 2402 may consult LSIB Gateway, KB, and TB documentation 2422, which identifies the locations of these specialized bit-cells in the network. Private Network Model 2420 and location documentation 2422 may be encrypted for security.

The operations which may be performed using the embedded instruments on the chip may be defined in Public Network Operations Description 2424 and Private Network Operations Description 2426. These descriptions may be provided in the Procedural Description Language (PDL). PDL may describe a number of vectors, with each vector containing instructions for performing a particular operation using an embedded instrument. The instructions may be binary signals to transmit to the instrument, flow control instructions such as if-then blocks, for-next loops, and do-while loops, and other instructions such as iRead, iWrite, and iReset. Accordingly, Public Network Operations Description 2424 may describe the operations which a user may perform using the public instruments on the chip, and Private Network Operations Description 2426 may describe the operations which a user may perform using the private instruments on the chip. Private Network Operations Description 2426 may be encrypted for security.

In accordance with the 1687 standard, the vectors in Public Network Operations Description 2424 and Private Network Operations Description 2426 may describe the operations as they would be applied at the instrument interface. To perform an operation, Network Operation Software Tool 2402 may translate the instructions in the vector for the operation from operations applied at the instrument interface to operations applied to the pins of Chip 2408. To do so, Network Operation Software Tool 2402 may consult Public Network Model 2418 and, for private instruments, Private Network Model 2420. For private instruments, Network Operation Software Tool 2402 may combine Public Model 2418 and Private Model 2420 to produce a complete model of the network. Using Public Model 2418 or the complete model, Network Operation Software Tool 2402 may produce the logic signals which should be applied to Chip 2408 to perform the operation. For hidden instruments, these signals may include signals for operating public SIB Gateways, LSIB Gateways, and KBs to access a hidden instrument, while avoiding TBs.

Obfuscation of TDI and TDO Values

If a curious or malicious person has access to Network Operation Software Tool 2402 and has a Private License File 2416 authorizing the person to operate hidden instruments, that person may attempt to learn how the instruments are hidden on the chip by reading the signals sent to and received from Chip 2408. The person may use Network Operation Software Tool 2402 to perform operations using a hidden instrument. The software tool applies serial scan vectors and the 1149.1 protocol to the 1149.1 port of the chip. With access to the 1149.1 port of the chip, the person may capture the values that enter the Test Data Input (TDI) and exit the Test Data Output (TDO) pins or ports of the chip. Recording these values would supply the serial data stream and information on the length of the scan chain when the hidden instrument is being accessed and operated.

To prevent this, the chip may be designed with obfuscation technologies that scramble data entering the chip, data leaving the chip, or both. Suitable obfuscation technologies are known in the art. Scrambling may also be referred to as encryption.

In addition, the software tool may over-shift (apply more bits than the length of the scan chain) or under-shift (apply fewer bits than the length of the scan chain) bits into the TDI port so that the length of the scan chain is not easily calculated. These measures may not only obfuscate the length of the active scan chain, but may also disguise or obfuscate the true data that identifies where locks, keys, and traps are located in the active scan chain.

Figure 25:
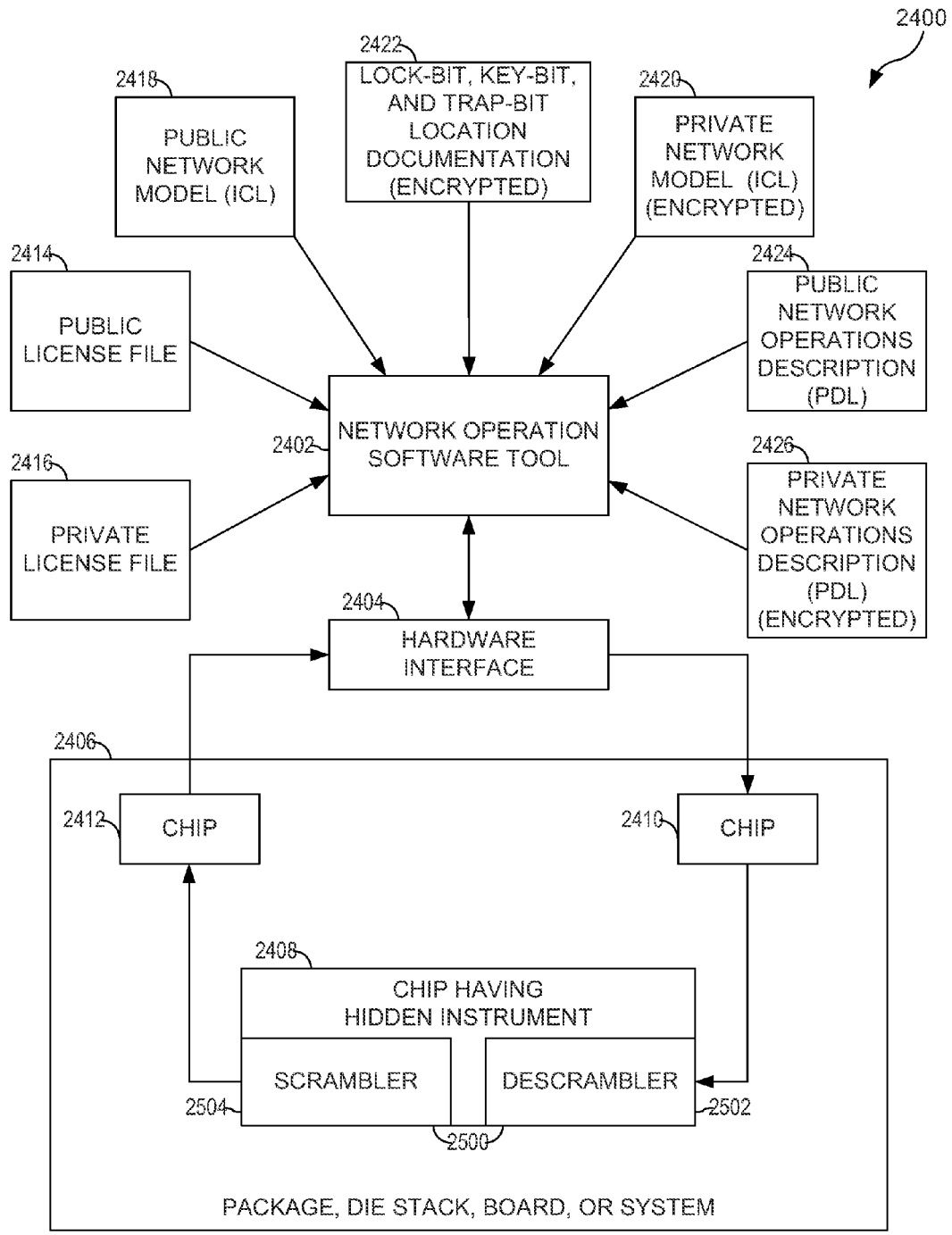
FIG. 25 depicts an example network operation software tool architecture with a scrambler/descrambler interface.

FIG. 25 is an example of a Descrambler/Scrambler Interface 2500 incorporated into a Chip 2408. When working with a Chip 2408 having a Descrambler/Scrambler Interface 2500, Network Operation Software Tool 2402 may scramble the signals it produces prior to transmitting those signals to Hardware Interface 2404. When Chip 2408 receives a signal, Descrambler 2502 descrambles the signal before transmitting it to the remainder of Chip 2408. When a signal leaves Chip 2408, Scrambler 2504 scrambles the signal.

How the signals are descrambled and scrambled for a particular Chip 2408 is defined in the Private Network Model 2420 for the chip. Variables such as clock time, applied cycle count, or an internal vector application counter may be associated with the input and output vector scrambling. The purpose of Descrambler/Scrambler Interface 2500 is to cause different applications of the same vector to Chip 2408 to cause a different chip behavior. Therefore, a person capturing a vector from the TDI pin during an operation using a hidden instrument may not repeat the operation by using the same vector. A licensed Network Operation Software Tool 2402 should be the only device which aligns the scrambling and descrambling to produce repeatable behavior.

Creation of an Instrument Access Network

A chip designer must make several considerations in developing and designing an instrument access network. Some considerations are which instruments are for public use, which instruments are of high proprietary value, and which instruments should be considered private but not of high proprietary value.

A chip design software tool may assist a chip designer in creating the chip architecture and producing the public and private documentation of the architecture. The designer may select how many levels of hierarchy to support, where to put the visible or public SIB Gateways to add or subtract scan-path segments, which themselves may be TDRs, and where to put the Locked SIB Gateways that insert hidden scan path segments when the Key values are stored in the KBs. In addition, the designer may select the number of KBs, where to put the KBs, if the location of the Key Bit-cells should be protected by TBs, where those TBs should be located, if those TBs should be SLTBs, and the Gateway, Key, and Trap values for each Protection bit. The chip design software tool may perform these selections for the chip designer.

Once the chip designer completes the chip design process, the designer must document the chip architecture. The location, number of, and values associated with the Protection Bits should be separated from the public documentation to preserve the proprietary content of the network. The documentation of the proprietary content may be kept in a separate file in an encrypted format. The chip design software tool may create the public and private documentation for the chip designer.

If the designer creates the documentation, then the documentation may be passed through an encryption tool. The chip design software tool may automatically verify that the design truly matches the documentation. An error in the documentation may render the chip totally unusable or force the designer to guess the location of the error. Therefore, verification that the design files match the encrypted private files is of high importance.

The chip design software tool may produce a representation of the completed chip. Actual chips, having the instruments hidden through the aforementioned access mechanisms, may then be created from the representation.

Other Applications

It must be noted that even though this hierarchical system of locked gateways, keys, and traps is described with a logic circuit network embodiment, the concept is also applicable to other methodologies. Examples include electrical networks with electrical switches, magnetic networks with magnetic field generators and magnetic field sensors, optical networks with light transmitting elements and light sensing elements, motion control networks (e.g., elevator controls), hydraulic control networks with pressure-operated valves, air handling ductwork networks, water or plumbing networks, magnetic control networks, or any other type of media that may be controlled with valves or switches.

For example, a series of oil-filled hydraulic lines may control pneumatic instruments that open and close floodgates on a dam. A publicly-known set of gates may exist which are easily operated by input levers and control knobs. The dam may have valves that may be opened to allow the pressure in a first level network to be passed on to a second level network. This second level network may have valves that may be opened to pass pressure on to a third level network. The third level network may contain valves that control pneumatic instruments that open or adjust water-flow passages or water-driven electricity generators. To prevent an unskilled or malicious operator from, for example, turning off a power generator, these instruments may be hidden in accordance with the principles described above.

The valves which may be opened to allow pressure to be passed from the first level network to the second level network or from the second level network to the third level network are gateways similar to the JTAG SIB Gateways. These hydraulic gateways may be locked using the same principles by which a SIB Gateway may be locked. Other valves may be designated as keys, and inputs from the keys may be required before the gateway may pass pressure to the next level.

Other valves may likewise be designated as traps to prevent a curious or malicious person from discovering the locks and keys by operating the input levers and control knobs in a random or deterministic way. This only allows certain input operations in known sequences to have access to the hidden functions, making it unlikely that a person without access to the known sequences will be able to operate the hidden instruments.

The term "storage unit" may generically designate a device storing a value, such as a JTAG bit-cell or a hydraulic valve in the above examples. Similarly, the terms "gateway storage unit," "key storage unit," and "trap storage unit" may respectively generically designate storage units which behave as LSIB Gateways, KBs, and TBs, without necessarily being JTAG bit-cells. The term "data path" may generically designate a path of signals through one or more storage units, such as a JTAG scan path, but is not necessarily part of a JTAG architecture. The term "data path segment" may generically designate a segment which may be inserted into a data path, such as a JTAG scan path segment, but is not necessarily part of a JTAG architecture.

Conclusion

Having thus described the present invention in various embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

We claim:

1. A method for accessing embedded instruments on an integrated circuit, the method comprising:
for each key storage unit in a set of one or more key storage units in a data path on the integrated circuit, the data path passing serially from a data in port to each of a plurality of data path storage units to a data out port, each data path storage unit comprising a shift register, the plurality of data path storage units comprising the set of one or more key storage units and a gateway storage unit:
shifting a key value for the key storage unit through the data path into the shift register of the key storage unit;
the key storage unit receiving an update signal;
in response to the key storage unit receiving the update signal, the key storage unit storing the key value in an update register of the key storage unit; and
in response to the update register storing the key value, the key storage unit transmitting a key signal to the gateway storage unit;
shifting a gateway value for the gateway storage unit through the data path into the shift register of the gateway storage unit;
the gateway storage unit receiving an update signal;

in response to the gateway storage unit receiving the key signal from each key storage unit and the gateway storage unit receiving the update signal, the gateway storage unit storing the gateway value in an update register of the gateway storage unit; and in response to the update register of the gateway storage unit storing the gateway value, the gateway storage unit inserting a data path segment in the data path, the data path segment passing serially through each of a set of one or more segment storage units, each segment storage unit comprising a shift register.

2. The method of claim 1, further comprising:

for each second key storage unit in a set of one or more second key storage units, each second key storage unit in the data path at least after the insertion of the data path segment in the data path:

shifting a key value for the second key storage unit through the data path into the shift register of the second key storage unit;

the second key storage unit receiving an update signal;

in response to the second key storage unit receiving the update signal, the second key storage unit storing the second key value in an update register of the second key storage unit; and in response to the update register storing the key value, the second key storage unit transmitting a key signal to a second gateway storage unit, the set of one or more segment storage units comprising the second gateway storage unit;

shifting a gateway value for the second gateway storage unit through the data path into the shift register of the second gateway storage unit;

the second gateway storage unit receiving an update signal;

in response to the second gateway storage unit receiving the key signal from each second key storage unit and the second gateway storage unit receiving the update signal, the second gateway storage unit storing the gateway value in an update register of the second gateway storage unit; and in response to the update register of the second gateway storage unit storing the gateway value, the second gateway storage unit inserting a second data path segment in the data path, the second data path segment passing serially through each of a set of one or more second segment storage units, each second segment storage unit comprising a shift register.

3. The method of claim 1, further comprising:
identifying the set of key storage units from a model of the integrated circuit; and
identifying the gateway storage unit from the model of the integrated circuit.

4. The method of claim 1, further comprising:
combining a public model of the integrated circuit with a private model of the integrated circuit to produce a combined model of the integrated circuit;
identifying the set of key storage units from the combined model of the integrated circuit; and
identifying the gateway storage unit from the combined model of the integrated circuit; and
wherein:
the public model of the integrated circuit identifies each key storage unit as configured to, in response to a capture signal, store a value in its shift register;
the public model of the integrated circuit identifies the gateway storage unit as configured to, in response to a capture signal, store a value in its shift register;
the private model of the integrated circuit identifies each key storage unit as a key storage unit; and
the private model of the integrated circuit identifies the gateway storage unit as a gateway storage unit.

5. The method of claim 1, further comprising determining, from a model of the integrated circuit, that access to the data path segment is necessary to access an instrument.

6. The method of claim 1, wherein the plurality of data path storage units further comprises a set of one or more trap storage units, and further comprising:
for each trap storage unit in the set of one or more trap storage units:
shifting a value which is not a trap value for the trap storage unit through the data path into the shift register of the trap storage unit;
the trap storage unit receiving an update signal; and
in response to the trap storage unit receiving the update signal, the trap storage unit storing the value in an update register of the trap storage unit.

7. The method of claim 6, further comprising:
identifying the set of trap storage units from a model of the integrated circuit.

8. A computer program product for accessing embedded instruments on an integrated circuit, the computer program product embodied on a non-transitory computer-readable medium, the computer program product comprising:
computer code for, for each key storage unit in a set of one or more key storage units in a data path on the integrated circuit, the data path passing serially from a data in port to each of a plurality of data path storage units to a data out port, each data path storage unit comprising a shift register, the plurality of data path storage units comprising the set of one or more key storage units and a gateway storage unit:
shifting a key value for the key storage unit through the data path into the shift register of the key storage unit; and
sending an update signal to the key storage unit;
computer code for shifting a gateway value for the gateway storage unit through the data path into the shift register of the gateway storage unit; and
computer code for sending an update signal to the gateway storage unit.

9. The computer program product of claim 8, further comprising:
computer code for, for each second key storage unit in a set of one or more second key storage units, each second key storage unit in the data path at least after the insertion of the data path segment in the data path:
shifting a key value for the second key storage unit through the data path into the shift register of the second key storage unit; and
sending an update signal to the second key storage unit;
computer code for shifting a gateway value for a second gateway storage unit through the data path into the shift register of the second gateway storage unit, the set of one or more segment storage units comprising the second gateway storage unit; and
computer code for sending an update signal to the second gateway storage unit.

10. The computer program product of claim 8, further comprising:
computer code for identifying the set of key storage units from a model of the integrated circuit; and
computer code for identifying the gateway storage unit from the model of the integrated circuit.

11. The computer program product of claim 8, further comprising:
  computer code for combining a public model of the integrated circuit with a private model of the integrated circuit to produce a combined model of the integrated circuit;
  computer code for identifying the set of key storage units from the combined model of the integrated circuit; and
  computer code for identifying the gateway storage unit from the combined model of the integrated circuit; and
  wherein:
    the public model of the integrated circuit identifies each key storage unit as configured to, in response to a capture signal, store a value in its shift register;
    the public model of the integrated circuit identifies the gateway storage unit as configured to, in response to a capture signal, store a value in its shift register;
    the private model of the integrated circuit identifies each key storage unit as a key storage unit; and
    the private model of the integrated circuit identifies the gateway storage unit as a gateway storage unit.

12. The computer program product of claim 8, further comprising computer code for determining, from a model of the integrated circuit, that access to the data path segment is necessary to access an instrument.

13. The computer program product of claim 8, wherein the plurality of data path storage units further comprises a set of one or more trap storage units, and further comprising:
  computer code for, for each trap storage unit in the set of one or more trap storage units:
    shifting a value which is not a trap value for the trap storage unit through the data path into the shift register of the trap storage unit;
    sending an update signal to the trap storage unit.

14. The computer program product of claim 13, further comprising computer code for identifying the set of trap storage units from a model of the integrated circuit.

15. An integrated circuit comprising:
  a data in port;
  a data out port;
  a plurality of data path storage units, each data path storage unit comprising a shift register;
  a data path passing serially from the data in port to each of the data path storage units to the data out port, wherein:
    the data in port, the data path storage units, and the data out port are all elements in the data path; and
    in response to a shift signal, each data path storage unit is configured to:
      transmit a value stored in its shift register to the next element in the data path;
      receive a new value from the previous element in the data path; and
      store the new value in the shift register of the data path storage unit;
  one or more segment storage units, each segment storage unit comprising a shift register; and
  a data path segment passing serially through each of the one or more segment storage units;
  wherein the data path storage units comprise:
    a gateway storage unit further comprising an update register;
    a set of one or more key storage units, each key storage unit further comprising an update register, each key storage unit configured to, in response to an update signal, store a value stored in its shift register in its update register; and
  wherein:
    each of the one or more key storage units is configured to, in response to its update register storing a key value, transmit a key signal to the gateway storage unit; and
    the gateway storage unit is configured to, in response to the gateway storage unit receiving a key signal from each of the set of key storage units and the gateway storage unit receiving an update signal, store a value stored in its shift register in its update register; and
    the gateway storage unit is configured to, in response to the gateway storage unit update register storing a gateway value, insert the data path segment in the data path.

16. The integrated circuit of claim 15, further comprising:
  a second data path segment;
  a second gateway storage unit in the one or more segment storage units, the second gateway storage unit further comprising an update register; and
  a set of one or more second key storage units, each second key storage unit in the one or more segment storage units or the plurality of data path storage units, each second key storage unit further comprising an update register, each second key storage unit configured to, in response to an update signal, store a value stored in its shift register in its update register;
  wherein:
    each of the one or more second key storage units is configured to, in response to its update register storing a key value, transmit a key signal to the second gateway storage unit; and
    the second gateway storage unit is configured to, in response to the second gateway storage unit receiving a key signal from each of the set of second key storage units and the second gateway storage unit receiving an update signal, store a value stored in its shift register in its update register; and
    the second gateway storage unit is configured to, in response to the second gateway storage unit update register storing a gateway value, insert the second data path segment in the data path.

17. The integrated circuit of claim 15, wherein the gateway storage unit is further configured to, in response to a capture signal, store a value in its shift register.

18. The integrated circuit of claim 15, wherein at least one of the set of key storage units is further configured to, in response to a capture signal, store a value in its shift register.

19. The integrated circuit of claim 15, wherein the data path storage units further comprise:
  a set of one or more trap storage units, each trap storage unit further comprising an update register, each trap storage unit configured to, in response to an update signal, store a value stored in its shift register in its update register;
  wherein:
    each of the one or more trap storage units is configured to, in response to its update register storing a trap value, prevent the gateway storage unit from inserting the data path segment; and
    at least one of the set of trap storage units is further configured to, in response to a capture signal, store a value in its shift register.

* * * * *